US011485936B2

(12) United States Patent
Ugazio et al.

(10) Patent No.: US 11,485,936 B2
(45) Date of Patent: Nov. 1, 2022

(54) FABRIC CARE COMPOSITION COMPRISING SILICONE MATERIALS

(71) Applicant: Dow Silicones Corporation, Midland, MI (US)

(72) Inventors: Stephane S. Ugazio, Seneffe (BE); Tatiana Dimitrova, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 940 days.

(21) Appl. No.: 16/317,839

(22) PCT Filed: Aug. 3, 2017

(86) PCT No.: PCT/EP2017/069749
§ 371 (c)(1),
(2) Date: Jan. 15, 2019

(87) PCT Pub. No.: WO2018/024861
PCT Pub. Date: Feb. 8, 2018

(65) Prior Publication Data
US 2020/0392431 A1 Dec. 17, 2020

(30) Foreign Application Priority Data

Aug. 3, 2016 (GB) .................................. 1613399
Mar. 6, 2017 (GB) .................................. 1701915

(51) Int. Cl.
| | |
|---|---|
| C08G 77/08 | (2006.01) |
| C11D 3/37 | (2006.01) |
| C08G 77/16 | (2006.01) |
| C08G 77/18 | (2006.01) |
| C08K 5/00 | (2006.01) |
| C08K 5/057 | (2006.01) |
| C08K 5/5419 | (2006.01) |

(52) U.S. Cl.
CPC ............ *C11D 3/3742* (2013.01); *C08G 77/08* (2013.01); *C08G 77/16* (2013.01); *C08G 77/18* (2013.01); *C08K 5/0025* (2013.01); *C08K 5/057* (2013.01); *C08K 5/5419* (2013.01)

(58) Field of Classification Search
IPC .............. C08K 5/057,5/5415, 5/0025, 5/5419; C08L 83/00, 83/04; C08G 77/08, 77/16, 77/18; C11D 3/001, 3/373, 3/3742; D06M 15/643, 15/647, 2200/50
See application file for complete search history.

(56) References Cited

U.S. PATENT DOCUMENTS

| | | |
|---|---|---|
| 3,030,371 A | 4/1962 | Walter |
| 3,334,067 A | 8/1967 | Weyenberg |
| 3,419,516 A | 12/1968 | Tarno |
| 4,087,585 A | 5/1978 | Schulz |
| 4,399,247 A * | 8/1983 | Ona ........................ C08K 5/09 252/8.61 |
| 4,754,013 A | 6/1988 | Antonen |
| 4,908,140 A | 3/1990 | Bausch et al. |
| 5,089,253 A | 2/1992 | Halloran |
| 5,126,389 A | 6/1992 | Ona et al. |
| 5,194,649 A | 3/1993 | Okawa |
| 5,232,611 A * | 8/1993 | Ohashi ................ D06M 15/647 252/8.61 |
| 5,262,088 A | 11/1993 | Hill et al. |
| 5,281,455 A | 1/1994 | Braun et al. |
| 5,300,171 A | 4/1994 | Braun et al. |
| 5,300,239 A * | 4/1994 | Ozaki ..................... C08L 83/08 8/115.64 |
| 5,380,464 A | 1/1995 | McGee et al. |
| 5,684,110 A | 11/1997 | Kawamura |
| 5,804,631 A | 9/1998 | Mine et al. |
| 5,840,794 A | 11/1998 | Palmer |
| 6,015,784 A | 1/2000 | Kazuta et al. |
| 6,169,142 B1 | 1/2001 | Nakano et al. |
| 6,521,587 B1 | 2/2003 | L'Hostis et al. |
| 6,534,581 B1 | 3/2003 | Kleyer et al. |
| 6,593,413 B2 | 7/2003 | Muramatsu et al. |
| 6,642,309 B2 | 11/2003 | Komitsu et al. |
| 7,144,953 B2 | 12/2006 | Ueda et al. |
| 7,417,105 B2 | 8/2008 | Landon et al. |
| 7,893,170 B2 | 2/2011 | Wakioka et al. |
| 7,951,458 B2 | 5/2011 | Ogura et al. |
| 7,973,108 B2 | 7/2011 | Okamoto et al. |
| 8,030,371 B2 | 10/2011 | Chaussade |

(Continued)

FOREIGN PATENT DOCUMENTS

| | | |
|---|---|---|
| CN | 1365379 A | 8/2002 |
| CN | 105440693 A | 3/2016 |

(Continued)

OTHER PUBLICATIONS

Michael A. Brook, Silicon in Organic, Organometallic and Polymer Chemistry, John Wiley & sons, Inc. (2000), pp. 285-287.
Noll, W.; Chemistry and Technology of Silicones, Academic Press Inc., New York, 1968, pp. 397-399.
International Search Report for Application No. PCT/EP2016/051573, dated Mar. 11, 2016, 4 pages.
International Search Report for Application No. PCT/EP2017/069743, dated Nov. 14, 2017, 3 pages.
International Search Report for Application No. PCT/EP2017/069744, dated Nov. 9, 2017, 3 pages.
International Search Report for Application No. PCT/EP2017/069745, dated Nov. 9, 2017, 3 pages.
International Search Report for Application No. PCT/EP2017/069746, dated Oct. 30, 2017, 4 pages.

(Continued)

*Primary Examiner* — Robert S Loewe
(74) *Attorney, Agent, or Firm* — Warner Norcross + Judd LLP

(57) ABSTRACT

The present invention relates to fabric care compositions comprising a silicone based material cured via a condensation cure chemistry, and at least one fabric care ingredient, in an acceptable medium. Also disclosed is a process to prepare the fabric care compositions and uses of said fabric care compositions.

9 Claims, No Drawings

(56) References Cited

U.S. PATENT DOCUMENTS

| | | |
|---|---|---|
| 8,231,944 B1 | 7/2012 | Schroeder |
| 8,536,109 B2 | 9/2013 | Delbrassinne et al. |
| 8,609,797 B2 | 12/2013 | Knepper et al. |
| 8,686,094 B2 | 4/2014 | Djurdjevic et al. |
| 8,785,537 B2 | 7/2014 | Carrard et al. |
| 8,801,890 B2 | 8/2014 | Verosky et al. |
| 8,865,830 B2 * | 10/2014 | Horstman ............... C08G 77/44 524/588 |
| 9,051,435 B2 | 6/2015 | Takei et al. |
| 9,212,262 B2 * | 12/2015 | Horstman ............... C08L 83/10 |
| 9,228,061 B2 | 1/2016 | Brandstadt et al. |
| 9,493,689 B2 | 11/2016 | Stanjek et al. |
| 9,527,985 B2 | 12/2016 | Okamatsu |
| 9,732,203 B2 | 8/2017 | Okamatsu |
| 9,976,105 B2 * | 5/2018 | Barnes ................... A61K 8/062 |
| 10,150,888 B2 | 12/2018 | Simon et al. |
| 10,414,907 B2 | 9/2019 | Takahara |
| 10,563,015 B2 | 2/2020 | Gubbels et al. |
| 2002/0010251 A1 | 1/2002 | Muramatsu et al. |
| 2002/0193273 A1 | 12/2002 | Richards, III et al. |
| 2003/0119917 A1 | 6/2003 | Fey et al. |
| 2004/0002571 A1 | 1/2004 | Sakamoto et al. |
| 2005/0143282 A1 * | 6/2005 | Creutz ................... A61Q 13/00 512/4 |
| 2006/0122295 A1 | 6/2006 | Oysaed et al. |
| 2006/0194067 A1 | 8/2006 | Beger et al. |
| 2006/0258818 A1 | 11/2006 | Kimura et al. |
| 2007/0173597 A1 | 7/2007 | Williams et al. |
| 2007/0219299 A1 | 9/2007 | Okamoto et al. |
| 2007/0237912 A1 | 10/2007 | Correia |
| 2007/0244249 A1 | 10/2007 | Correia |
| 2007/0282047 A1 | 12/2007 | Kimura et al. |
| 2007/0287780 A1 | 12/2007 | Wakabayashi et al. |
| 2008/0033087 A1 | 2/2008 | Okamoto et al. |
| 2008/0076878 A1 | 3/2008 | Wakioka et al. |
| 2008/0172807 A1 | 7/2008 | Brun |
| 2008/0179616 A1 | 7/2008 | Lee et al. |
| 2008/0194773 A1 | 8/2008 | Wakioka et al. |
| 2008/0279901 A1 | 11/2008 | Prigent et al. |
| 2008/0284106 A1 | 11/2008 | Maton et al. |
| 2008/0287636 A1 | 11/2008 | Wakabayashi et al. |
| 2008/0292572 A1 | 11/2008 | Benabdillah |
| 2008/0312365 A1 | 12/2008 | Maton et al. |
| 2008/0312366 A1 | 12/2008 | Maton et al. |
| 2008/0312367 A1 | 12/2008 | Maton et al. |
| 2008/0319152 A1 | 12/2008 | Okamoto et al. |
| 2009/0029043 A1 | 1/2009 | Rong et al. |
| 2009/0042043 A1 * | 2/2009 | Joseph ................... C08L 83/00 524/502 |
| 2009/0215944 A1 | 8/2009 | Maton et al. |
| 2009/0234052 A1 | 9/2009 | Maton et al. |
| 2010/0093598 A1 | 4/2010 | Davio et al. |
| 2010/0137454 A1 | 6/2010 | Barmes et al. |
| 2010/0144585 A1 | 6/2010 | Aksoy et al. |
| 2010/0184883 A1 | 7/2010 | Detemmerman et al. |
| 2011/0003081 A1 | 1/2011 | Maton et al. |
| 2011/0028646 A1 | 2/2011 | Sixt et al. |
| 2011/0144246 A1 | 6/2011 | Dabbous et al. |
| 2011/0165206 A1 * | 7/2011 | Liu ........................ A61K 8/062 977/773 |
| 2011/0248314 A1 | 10/2011 | Takei et al. |
| 2012/0016063 A1 | 1/2012 | Maton et al. |
| 2012/0022209 A1 | 1/2012 | Djurdjevic et al. |
| 2012/0022210 A1 | 1/2012 | Davio et al. |
| 2012/0123537 A1 | 5/2012 | Manesis et al. |
| 2012/0214902 A1 | 8/2012 | Detemmerman et al. |
| 2012/0214925 A1 | 8/2012 | Gubbels et al. |
| 2013/0260068 A1 * | 10/2013 | Serobian ............... C09D 183/04 524/266 |
| 2013/0338289 A1 | 12/2013 | Jadot et al. |
| 2014/0024731 A1 | 1/2014 | Blanc et al. |
| 2014/0235812 A1 | 8/2014 | Brandstadt et al. |
| 2014/0238471 A1 | 8/2014 | Wakita et al. |
| 2014/0256539 A1 * | 9/2014 | Takei ..................... C08G 77/38 502/170 |
| 2014/0350176 A1 | 11/2014 | Fisher et al. |
| 2014/0364515 A1 | 12/2014 | Zeng et al. |
| 2015/0007938 A1 | 1/2015 | Stanjek et al. |
| 2015/0166859 A1 | 6/2015 | Choffat et al. |
| 2015/0183951 A1 | 7/2015 | Bhagwagar et al. |
| 2015/0224036 A1 | 8/2015 | Hasegawa |
| 2015/0257988 A1 | 9/2015 | Hasegawa |
| 2015/0315437 A1 | 11/2015 | Albaugh et al. |
| 2016/0009883 A1 | 1/2016 | Pernot |
| 2016/0326415 A1 | 11/2016 | Jadot et al. |
| 2017/0002201 A1 | 1/2017 | Von Malotki et al. |
| 2018/0009951 A1 | 1/2018 | Gubbels et al. |
| 2018/0237720 A1 | 8/2018 | Barnes et al. |
| 2019/0177486 A1 | 6/2019 | Baily et al. |
| 2019/0177584 A1 | 6/2019 | Gubbels et al. |
| 2019/0291024 A1 | 9/2019 | Rahma et al. |
| 2019/0338077 A1 | 11/2019 | Chambard et al. |
| 2020/0140617 A1 | 5/2020 | Gubbels et al. |
| 2020/0190324 A1 | 6/2020 | Gubbels et al. |
| 2020/0392431 A1 * | 12/2020 | Ugazio ................ D06M 15/643 |
| 2020/0398537 A1 | 12/2020 | Gubbels et al. |
| 2020/0399514 A1 | 12/2020 | Gubbels et al. |

FOREIGN PATENT DOCUMENTS

| | | |
|---|---|---|
| CN | 105505297 A | 4/2016 |
| EP | 0217501 | 4/1987 |
| EP | 217501 A2 | 4/1987 |
| EP | 341952 A2 | 11/1989 |
| EP | 356210 A2 | 2/1990 |
| EP | 393511 A2 | 10/1990 |
| EP | 539234 A2 | 4/1993 |
| EP | 2221328 A2 | 8/2010 |
| EP | 2221329 A1 | 8/2010 |
| EP | 2792690 A1 | 10/2014 |
| GB | 2424898 A | 10/2006 |
| JP | S5269460 A | 6/1977 |
| JP | H08269331 A | 10/1996 |
| JP | H08302193 A | 11/1996 |
| JP | 2000178448 A | 6/2000 |
| JP | 2000281523 A | 10/2000 |
| JP | 2001200161 A | 7/2001 |
| JP | 2002205911 A | 7/2002 |
| JP | 2002235004 A | 8/2002 |
| JP | 2003226812 A | 8/2003 |
| JP | 2006342327 A | 12/2006 |
| JP | 2007119695 A | 5/2007 |
| JP | 2008174554 A | 7/2008 |
| JP | 2010248446 A | 11/2010 |
| JP | 2011137119 A | 7/2011 |
| JP | 2012510573 | 5/2012 |
| JP | 2012251058 A | 12/2012 |
| JP | 5180140 B2 | 4/2013 |
| JP | 2013234245 A | 11/2013 |
| JP | 5621211 B2 | 11/2014 |
| JP | 2016128497 A | 7/2016 |
| WO | 2001042365 A1 | 6/2001 |
| WO | 2001096463 A2 | 12/2001 |
| WO | 2007117551 A1 | 10/2007 |
| WO | 2007117552 A1 | 10/2007 |
| WO | 2008045395 A2 | 4/2008 |
| WO | 2008045417 A2 | 4/2008 |
| WO | 2008045427 A1 | 4/2008 |
| WO | 2009013309 A1 | 1/2009 |
| WO | 2009128883 A1 | 10/2009 |
| WO | 2010115782 A2 | 10/2010 |
| WO | 2010117744 A2 | 10/2010 |
| WO | 2010143357 | 12/2010 |
| WO | 2010143357 A1 | 12/2010 |
| WO | 2013036548 A2 | 3/2013 |
| WO | 2013100175 A1 | 7/2013 |
| WO | 2014022377 A1 | 2/2014 |
| WO | 2016120270 A1 | 8/2016 |
| WO | 2017030128 A1 | 2/2017 |
| WO | 2017191322 A1 | 11/2017 |
| WO | 2018024856 A1 | 2/2018 |
| WO | 2018024857 A1 | 2/2018 |

(56) References Cited

FOREIGN PATENT DOCUMENTS

| WO | 2018024858 A1 | 2/2018 |
|---|---|---|
| WO | 2018024859 A1 | 2/2018 |
| WO | 2018024860 A1 | 2/2018 |
| WO | 2018024865 A1 | 2/2018 |
| WO | 2018050503 A1 | 3/2018 |
| WO | 2018200796 A1 | 11/2018 |

OTHER PUBLICATIONS

International Search Report for Application No. PCT/EP2017/069748, dated Sep. 27, 2017, 4 pages.
International Search Report for Application No. PCT/EP2017/069749, dated Oct. 30, 2017, 4 pages.
International Search Report for Application No. PCT/EP2017/069753, dated Nov. 14, 2017, 3 pages.
Machine assisted English translation of CN1365379A obtained from https://patents.google.com/patent on Mar. 8, 2021, 12 pages.
Machine assisted English translation of CN105440693A obtained from https://patents.google.com/patent on Mar. 8, 2021, 6 pages.
Machine assisted English translation of CN105505297A obtained from https://patents.google.com/patent on Mar. 8, 2021, 10 pages.
Machine assisted English translation of JP5180140B2 obtained from https://patents.google.com/patent on Mar. 8, 2021, 10 pages.
Machine assisted English translation of JP5621211B2 obtained from https://patents.google.com/patent on Mar. 8, 2021, 10 pages.
Machine assisted English translation of JPH08269331A obtained from https://patents.google.com/patent on Mar. 8, 2021, 8 pages.
Machine assisted English translation of JPH08302193A obtained from https://patents.google.com/patent on Mar. 8, 2021, 7 pages.
Machine assisted English translation of JPS5269460A obtained from https://worldwide.espacenet.com/patent on Mar. 8, 2021, 10 pages.
Machine assisted English translation of JP2000178448A obtained from https://worldwide.espacenet.com/patent on Mar. 9, 2021, 8 pages.
Machine assisted English translation of JP2000281523A obtained from https://worldwide.espacenet.com/patent on Mar. 9, 2021, 19 pages.
Machine assisted English translation of JP2001200161A obtained from https://patents.google.com/patent on Mar. 8, 2021, 7 pages.
Machine assisted English translation of JP2002205911A obtained from https://patents.google.com/patent on Mar. 9, 2021, 10 pages.
Machine assisted English translation of JP2002235004A obtained from https://patents.google.com/patent on Mar. 9, 2021, 10 pages.
Machine assisted English translation of JP2003226812A obtained from https://patents.google.com/patent on Mar. 9, 2021, 13 pages.
Machine assisted English translation of JP2006342327A obtained from https://patents.google.com/patent on Mar. 8, 2021, 9 pages.
Machine assisted English translation of JP2007119695A obtained from https://patents.google.com/patent on Mar. 8, 2021, 9 pages.
Machine assisted English translation of JP2008174554A obtained from https://patents.google.com/patent on Mar. 9, 2021, 18 pages.
Machine assisted English translation of JP2010248446A obtained from https://patents.google.com/patent on Mar. 8, 2021, 10 pages.
Machine assisted English translation of JP2011137119A obtained from https://patents.google.com/patent on Mar. 8, 2021, 13 pages.
Machine assisted English translation of JP2012251058A obtained from https://patents.google.com/patent on Mar. 8, 2021, 16 pages.
Machine assisted English translation of JP2013234245A obtained from https://patents.google.com/patent on Mar. 8, 2021, 8 pages.
Machine assisted English translation of JP2016128497A obtained from https://patents.google.com/patent on Mar. 9, 2021, 15 pages.
Machine assisted English translation of WO2010143357A1 obtained from https://patents.google.com/patent on Mar. 8, 2021, 13 pages.
Machine assisted English translation of WO2017030128A1 obtained from https://patents.google.com/patenton Mar. 8, 2021, 18 pages.
Lee, et al, 1970 Journal of Polymer Science Part A-2, Polymer Physics.
O' Lenick, Jr., Basic Silicone Chemistry—a Review, Aug. 1999, Silicone Spectator, Jan. 2009.
Mills, E., European Polymer Journal, 1969, vol. 5, p. 675-695.

* cited by examiner

FABRIC CARE COMPOSITION COMPRISING SILICONE MATERIALS

This invention claims priority from patent application GB 1613399.3 filed on Aug. 3, 2016 and from patent application GB1701915.9 filed on Mar. 6, 2017.

This disclosure relates to fabric care compositions comprising a silicone based material cured via a condensation cure chemistry, and at least one fabric care ingredient, in an acceptable medium. Also disclosed is a process to prepare the fabric care compositions and uses of said fabric care compositions.

Silicone materials of various kinds may be prepared using various reaction systems. Examples of silicone materials include at least straight-chain polymers, branched polymers, elastomeric polymers, gums, resinous structures. These silicone materials vary in their polymeric structure, in their viscosity or consistency, and in a lot of general properties such as hardness, flowability, stickiness, compatibility.

A variety of reaction mechanisms exist to produce the wide variety of silicone materials. Examples include hydrosilylation cure or addition cure, making use of vinyl-functional polymers, oligomers with Si—H groups, and a metal complex catalyst, such as platinum (Pt); peroxide cure or free radical cure utilizing free radicals generated by organic peroxides that decompose at elevated temperatures, initiating a crosslinking reaction; and condensation cure.

Silicone materials find uses in fabric care applications for sensory benefits on fabric, such as softening, ease of ironing.

There is an ongoing need for silicone materials which provide for care of fabric substrates.

The present invention relates to fabric care compositions comprising silicone based material cured via a condensation cure chemistry. In particular, the present disclosure relates to fabric care compositions comprising a silicone based material cured via a condensation cure chemistry; and at least one fabric care ingredient, in an acceptable medium; where the silicone based material cured via a condensation cure chemistry is the condensation reaction product of:

(i) at least one condensation curable silyl terminated polymer having at least one, typically at least 2 hydrolysable and/or hydroxyl functional groups per molecule;

(ii) a cross-linker selected from silanes having at least 2 hydrolysable groups and/or silyl functional molecules having at least 2 silyl groups, each silyl group containing at least one hydrolysable group; and (iii) a condensation catalyst selected from the group of titanates or zirconates characterized in that the molar ratio of hydroxyl groups to hydrolysable groups is between 0.4:1 to 2:1 using a monosilane cross linker or 0.2:1 to 10:1 using disilyl crosslinker and the molar ratio of M-OR functions to the hydroxyl groups is comprised between 0.01:1 and 0.6:1, where M is titanium or zirconium.

The condensation cured silicone material typically exhibits a hardness below Shore 80 in the type 00 scale according to ASTM D 2240-05(2010). Products having a hardness of Shore below 0 in the 00 scale, i.e. soft materials may also be obtained. The hardness of such materials are typically measured with the help of a penetrometer. The condensation cured materials can also be in a liquid (flowable) form, that is, in a form where the material can be poured from one container into another under the sole influence of gravity within minutes (in less than 60 minutes). In some instances the material may also be a thick paste that is not typically pourable, but "pumpable", that is, it may be transferred from one recipient to the other by a pumping device.

The present silicone based materials cured via a condensation cure chemistry may have different viscosity/consistency ranging from a flowable polymers with various elasticity to gels of different hardness. These materials may be used in fabric care applications, where they provide for conditioning benefits when present in a shampoo; hold when present in a leave in conditioner; smooth skin feel when present in a skin care cream; SPF boost when present in a sun care cream.

The terms "silanol", "hydroxysilyl", "hydroxyl", "SiOH" may be used interchangeably in the scope of the present invention, to indicate a condensation curable silyl terminating group of a polymer, bearing at least one hydroxyl functional group.

The terms "alkoxy", "hydrolysable", "SiOR" may be used interchangeably in the scope of the present invention, to indicate a condensation curable silyl terminating group of a polymer, bearing at least one hydrolysable functional group.

The terms "ratio SiOH/SiOR", "ratio hydroxyl groups to hydrolysable groups", "ratio silanol/alkoxy groups" may also be used interchangeably, in the scope of the present invention.

The relationship of molecular weight to viscosity of polydimethylsiloxane is described in scientific literature, for example, in at least Mills, E., European Polymer Journal, 1969, vol. 5, p. 675-695. The formula published in this article can be used to calculate approximately the weight average molecular weight of polymers (Mw) with an accuracy of about 10%. For condensation polymerization, the polydispersity index (PI) is the ratio Mw/Mn, and is approximately 2. From this relationship, the average molecular weight in number (Mn) can be calculated.

The Mn and Mw of silicone can also be determined by Gel Permeation Chromatography (GPC) with a precision of about 10-15%. This technique is a standard technique, and yields values for Mw (weight average), Mn (number average) and polydispersity index (PI) (where PI=Mw/Mn).

Mn value provided in this application have been determined by GPC and represent a typical value of the polymer used. If not provided by GPC, the Mn may also be obtained from calculation based on the dynamic viscosity of said polymer.

For example, the silanol content in mmol per 100 g of the Hydroxydimethylsilyl terminated polydimethyl siloxane can be determined with the average molecular weight in number (Mn) of the polymer using the following formula:

$$\text{SiOH content (mmol/100 g of polymer)} = 2 \times 100 \times 1000/\text{Mn}$$

(where 100 is for amount in grams, 1000 is for mmol)

Similarly, the SiOR content in mmol per 100 g of the Trialkoxysilyl terminated polydimethylsiloxane of 56,000 mPa·s can be determined with the average molecular weight in number (Mn) of the polymer using the following formula:

$$\text{SiOR content (mmol/100 g of polymer)} = F \times 100 \times 1000/\text{Mn}$$

where F represents the number of alkoxy function (SiOR) present in the polymer, ie 6 for hexa alkoxy functional polymers (and where 100 is for amount in grams, 1000 is for mmol).

For non-polymeric molecules the following formula can be used $$\text{SiOR content (mmol/100 g of polymer)} = F \times 100 \times 1000/\text{MW}$$

where F represents the number of alkoxy function present in the molecule and MW is the molecular weight of the molecule (and where 100 is for amount in grams, 1000 is for mmol).

The silanol molar content related to a polymer is equal to the amount in g of hydroxyl terminated polymer in 100 g of the mixed product divided by the average molecular weight in number of the polymer multiply by the average number of hydroxyl functions present in the polymer, typically 2. If there are several hydroxyl functional polymers in the formulation, the sum of the molar content of each polymer is summed up to constitute the total silanol molar content in the formulation. The total silanol molar content is calculated for 100 g of the mixed formulation.

The alkoxy molar content related to a substance is equal to the amount in g of alkoxy functional molecule in 100 g of the mixed product divided by the molecular weight of the molecule or the average molecular weight in number in case it is polymeric alkoxy functional molecule multiply by the average number of alkoxy functions present in the molecule. The sum of the molar content of each molecule or polymer is summed up to constitute the total alkoxy molar content in the formulation. The total alkoxy molar content is calculated for 100 g of the mixed formulation.

The silanol to alkoxy molar ratio is then calculated by dividing the total silanol molar content by the total alkoxy molar content.

Polymer (i) is at least one or alternatively a moisture/condensation curable silyl terminated polymer. Any suitable moisture/condensation curable silyl terminated polymer may be utilised including polydialkyl siloxanes, alkylphenyl siloxane, or organic based polymers with silyl terminal groups e.g. silyl polyethers, silyl acrylates and silyl terminated polyisobutylenes or copolymers of any of the above. Polymer (i) may be selected from polysiloxane based polymer containing at least two hydroxyl or hydrolysable groups and/or organic based polymer having silyl terminal groups, each bearing at least one hydrolysable group The polymer (i) may be a polysiloxane based polymer containing at least two hydroxyl or hydrolysable groups, alternatively, the polymer comprises terminal hydroxyl or hydrolysable groups.

Examples of suitable hydroxyl or hydrolysable groups include —Si(OH)$_3$, —(R$^a$)Si(OH)$_2$, —(R$^a$)$_2$Si(OH), —R$^a$Si(OR$^b$)$_2$, —Si(OR$^b$)$_3$, —R$^a$$_2$SiOR$^b$ or —(R$^a$)$_2$Si—R$^c$—SiR$^d_k$(OR$^b$)$_{3-k}$ where each R$^a$ independently represents a monovalent hydrocarbyl group, for example, an alkyl group, in particular having from 1 to 8 carbon atoms; each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and k has the value 0, 1 or 2.

Polymer (i) may have the general formula (1)

(1)

where X$^3$ and X$^1$ are independently selected from siloxane groups which terminate in hydroxyl or hydrolysable groups and A is a siloxane containing polymeric chain.

Examples of hydroxyl-terminating or hydrolysable groups X$^3$ or X$^1$ include —Si(OH)$_3$, —(R$^a$)Si(OH)$_2$, —(R$^a$)$_2$Si(OH), —(R$^a$)Si(OR$^b$)$_2$, —Si(OR$^b$)$_3$, —(R$^a$)$_2$SiOR$^b$ or —(R$^a$)$_2$Si—R$^c$—Si(R$^d$)$_p$(OR$^b$)$_{3-p}$ as defined above with each R$^b$ group, when present, typically being a methyl group. The X$^3$ and/or X$^1$ terminal groups may be hydroxydialkyl silyl groups, e.g. hydroxydimethyl silyl groups or alkoxydialkyl silyl groups e.g. methoxydimethyl silyl or ethoxydimethyl silyl.

Examples of suitable siloxane groups in polymeric chain A of formula (1) are those which comprise a polydiorganosiloxane chain. Thus polymeric chain A may include siloxane units of formula (2):

(2)

in which each R$^5$ is independently an organic group such as a hydrocarbyl group having from 1 to 10 carbon atoms optionally substituted with one or more halogen group such as chlorine or fluorine and s is 0, 1 or 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some or substantially all of the groups R$^5$ are methyl.

For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Typically the polymers of the above type will have a viscosity in the order of 1,000 to 300,000 mPa·s, alternatively 1,000 to 100,000 mPa·s at 25° C. measured by using a Brookfield cone plate viscometer (RV DIII) using a cone plate.

Typical polymer (i) containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

The polymer (i) may alternatively be an organic based polymer having silyl terminal groups, each bearing at least one hydrolysable group. Typical silyl terminal groups include silyl polyethers, silyl acrylates and silyl terminated polyisobutylenes.

In the case of silyl polyethers, the polymer chain is based on polyoxyalkylene based units (organic). Such polyoxyalkylene units preferably comprise a linear predominantly oxyalkylene polymer comprised of recurring oxyalkylene units, (—C$_n$H$_{2n}$—O—) illustrated by the average formula (—C$_n$H$_{2n}$—O—)$_m$ wherein n is an integer from 2 to 4 inclusive and m is an integer of at least four. The average molecular weight of each polyoxyalkylene polymer block may range from about 300 to about 10,000, but can be higher in molecular weight. Moreover, the oxyalkylene units are not necessarily identical throughout the polyoxyalkylene monomer, but can differ from unit to unit. A polyoxyalkylene block, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene units may include for example: units of the structure

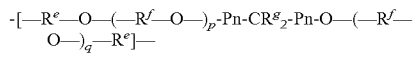

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts p and q is a positive integer in the range from 3 to 30.

The backbone of the organic section of polymer (i) which may contain organic leaving groups within the molecule, is not particularly limited and may be any of organic polymers having various backbones. The backbone may include at least one selected from a hydrogen atom, a carbon atom, a nitrogen atom, an oxygen atom, and a sulphur atom because the resulting composition has excellent curability.

Crosslinkers (ii) that can be used are generally moisture curing
  silanes having at least 2 hydrolysable groups, alternatively at least 3 hydrolysable groups per molecule group; and/or
  silyl functional molecules having at least 2 silyl groups, each silyl group containing at least one hydrolysable group.

Typically, a cross-linker requires a minimum of 2 hydrolysable groups per molecule and preferably 3 or more. In some instances, the crosslinker (ii) having two hydrolysable groups may be considered a chain extender. The crosslinker (ii) may thus have two but alternatively has three or four silicon-bonded condensable (preferably hydroxyl and/or hydrolysable) groups per molecule which are reactive with the condensable groups in organopolysiloxane polymer (i).

For the sake of the disclosure herein a monosilane cross-linker shall be understood to mean a molecule containing a single silyl functional group, which contains at least two hydrolysable groups.

For the sake of the disclosure herein a disilyl functional molecule is a silyl functional molecule containing two silyl groups, each silyl group containing at least one hydrolysable group. The disilyl functional molecule comprises two silicon atoms having each at least one hydrolysable group, where the silicon atoms are separated by an organic or siloxane spacer. Typically, the silyl groups on the disilyl functional molecule may be terminal groups. The spacer may be a polymeric chain.

For the sake of the disclosure herein a disilane is a silyl functional molecule having at least 2 silyl groups where the two silicon atoms are bonded to one another.

The hydrolysable groups on the silyl groups include acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). In some instances, the hydrolysable group may include hydroxyl groups.

The monosilane cross-linker (ii) include alkoxy functional silanes, oximosilanes, acetoxy silanes, acetonoxime silanes, enoxy silanes.

When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. The fourth silicon-bonded organic groups may be methyl.

A typical monosilane may be described by formula (3)

wherein $R^5$ is described above and r has a value of 2, 3 or 4. Typical silanes are those wherein R" represents methyl, ethyl or vinyl or isobutyl. R" is an organic radical selected from linear and branched alkyls, allyls, phenyl and substituted phenyls, acethoxy, oxime. In some instances, $R^5$ represents methyl or ethyl and r is 3.

Another type of suitable crosslinkers (ii) are molecules of the type $Si(OR^5)_4$ where $R^5$ is as described above, alternatively propyl, ethyl or methyl. Partials condensates of $Si(OR^5)_4$ may also be considered.

In one embodiment the cross-linker (ii) is a silyl functional molecule having at least 2 silyl groups having each at least 1 and up to 3 hydrolysable groups, alternatively each silyl group has at least 2 hydrolysable groups.

The crosslinker (ii) may be a disilyl functional polymer, that is, a polymer containing two silyl groups, each containing at least one hydrolysable group such as described by the formula (4):

where y and z are independently an integer of 1, 2 or 3, alternatively 2 or 3. Rv is an organic or polysiloxane-based fragment.

The disilyl functional crosslinker (ii) may have a siloxane or organic polymeric backbone.

In the case of such siloxane or organic based cross-linkers the molecular structure can be straight chained, branched, cyclic or macromolecular. Suitable polymeric crosslinkers (ii) may have a similar polymeric backbone chemical structure to polymeric chain A as depicted in formula (1) above.

Examples of disilyl polymeric crosslinkers (ii) with a silicone or organic polymer chain bearing alkoxy functional end groups include 1,6-bis(trimethoxysilyl)hexane (alternatively known as hexamethoxydisilylhexane HMSH), polydimethylsiloxanes having at least one trialkoxy terminal where the alkoxy group may be a methoxy or ethoxy group.

Further examples of disilyl polymeric crosslinkers (ii) may be described by the general formula (5):

where:
  W is $—Si(R^8)_2\text{-}(D)_f\text{-}R^9—Si\ R^8_t(OR^{12})_{3-t}$ and
  D is $—R^9—(Si(R^8)_2—O)_h—Si(R^8)_2—$
  $R^8$ represents an alkyl group having from 1 to 6 carbon atoms, a vinyl group or a phenyl group, or fluorinated alkyl
  $R^9$ is a divalent hydrocarbon group
  h is an integer between 1 and 6
  f is 0 or an integer,
  $R^{12}$ is an alkyl or alkoxy group in which the alkyl groups have up to 6 carbon atoms and
  t has the value 0, 1 or 2
and where B represents a substantially linear backbone, which can be either organic or polysiloxane based, optionally having maximum of 5% branching.

A typical organic backbone B will be a polyether. A typical siloxane-based backbone B will be —[SiO$_{(4-j)/2}$ (R$^1$)$_j$]$_w$— where w is an integer from 50 to 5000; j is on average from 1.9 to 2; R$_1$ is selected from monovalent alkyl radical form 1 to 10 carbon atoms (alternatively 1 to 4 carbon atoms) or from monovalent halohydrocarbon radicals, cyanolakyl radicals all with less than 18 carbon atoms.

In some instances, R$^8$ is methyl, R$^9$ is either a methylene or ethylene group, t is 0 or 1, R$^{12}$ is a methyl or ethyl group. In some instances, at least one W group is a —Si(R$^8$)$_2$-(D)$_t$-R$^9$—SiR$^8{}_t$(O R$^{12}$)$_{3-t}$ group. A small proportion of W groups may be Si(alkyl)$_3$- groups (where the alkyl groups are preferably methyl groups).

Crosslinkers (ii) thus include alkyltrialkoxysilanes such as methyltrimethoxysilane (MTM) and methyltriethoxysilane, tetraethoxysilane, partially condensed tetraethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyltris-methylethylketoximo)silane, methyltris(methylethylketoximino)silane, methyltris(isopropenoxy)silane, vinyltris (isopropenoxy)silane, ethylpolysilicate, n-propylorthosilicate, ethylorthosilicate, dimethyltetraacetoxydisiloxane, oximosilanes, acetoxy silanes, acetonoxime silanes, enoxy silanes and other such trifunctional alkoxysilanes as well as partial hydrolytic condensation products thereof; bis(trialkoxysilylalkyl)amines, bis(dialkoxyalkylsilylalkyl)amine, bis[trialkoxysilylalkyl) N-alkylamine, bis[dialkoxyalkylsilylalkyl) N-alkylamine, bis (trialkoxysilylalkyl)urea, bis(dialkoxyalkylsilylalkyl) urea, bis[3-trimethoxysilylpropyl)amine, bis[3-triethoxysilylpropyl)amine, bis[4-trimethoxysilylbutyl)amine, bis[4-triethoxysilylbutyl)amine, bis[3-trimethoxysilylpropyl)N-methylamine, bis[3-triethoxysilylpropyl) N-methylamine, bis[4-trimethoxysilylbutyl) N-methylamine, bis[4-triethoxysilylbutyl) N-methylamine, bis[3-trimethoxysilylpropyl) urea, bis[3-triethoxysilylpropyl)urea, bis[4-trimethoxysilylbutyl)urea, bis[4-triethoxysilylbutyl) urea, bis[3-dimethoxymethylsilylpropyl)amine, bis[3-dimethoxymethyl silylpropyl)amine, bis[4-dimethoxymethylsilylbutyl)amine, bis[4-diethoxymethyl silylbutyl)amine, bis[3-dimethoxymethylsilylpropyl) N-methylamine, bis[3-diethoxymethyl silylpropyl) N-methylamine, bis[4-dimethoxymethylsilylbutyl) N-methylamine, bis[4-diethoxymethyl silylbutyl) N-methylamine, bis[3-dimethoxymethylsilylpropyl)urea, bis[3-diethoxymethyl silylpropyl) urea, bis[4-dimethoxymethylsilylbutyl) urea, bis[4-diethoxymethyl silylbutyl)urea, bis[3-dimethoxyethylsilylpropyl)amine, bis[3-diethoxyethyl silylpropyl)amine, bis[4-dimethoxyethylsilylbutyl)amine, bis[4-diethoxyethyl silylbutyl)amine, bis[3-dimethoxyethylsilylpropyl) N-methylamine, bis[3-diethoxyethyl silylpropyl) N-methylamine, bis[4-dimethoxyethylsilylbutyl) N-methylamine, bis[4-diethoxyethyl silylbutyl) N-methylamine, bis[3-dimethoxyethylsilylpropyl)urea bis[3-diethoxyethyl silylpropyl) urea, bis[4-dimethoxyethylsilylbutyl)urea and/or bis[4-diethoxyethyl silylbutyl)urea; bis (triethoxysilylpropyl)amine, bis(trimethoxysilylpropyl) amine, bis[trimethoxysilylpropyl)urea, bis [triethoxysilylpropyl)urea, bis(diethoxymethylsilylpropyl) N-methylamine; Di or Trialkoxy silyl terminated polydialkyl siloxane, di or trialkoxy silyl terminated polyarylalkyl siloxanes, di or trialkoxy silyl terminated polypropyleneoxide, polyurethane, polyacrylates; polyisobutylenes; Di or triacetoxy silyl terminated polydialkyl; polyarylalkyl siloxane; Di or trioximino silyl terminated polydialkyl; polyarylalkyl siloxane; Di or triacetonoxy terminated polydialkyl or polyarylalkyl. The cross-linker (ii) used may also comprise any combination of two or more of the above.

The molar ratio of hydroxyl groups to hydrolysable groups is between 0.4:1 to 2:1 using a monosilane cross-linker or 0.2:1 to 10:1, alternatively 0.1:1 to 10:1, alternatively 0.1:1 to 3: 1, using a disilyl functional cross-linker.

The composition further comprises a condensation catalyst. This increases the speed at which the composition cures. The catalyst chosen for inclusion in a particular silicone composition depends upon the speed of cure required.

Titanate and/or zirconate based catalysts may comprise a compound according to the general formula Ti[OR$^{22}$]$_4$ or Zr[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of R$^{22}$ include but are not restricted to methyl, ethyl, propyl, isopropyl, butyl, tertiary butyl and a branched secondary alkyl group such as 2, 4-dimethyl-3-pentyl. Alternatively, when each R$^{22}$ is the same, R$^{22}$ is an isopropyl, branched secondary alkyl group or a tertiary alkyl group, in particular, tertiary butyl. Suitable titanate examples include tetra n-butyl titanate, tetra t-butyl titanate, titanium tetrabutoxide, tetraisopropyl titanate, tetrakis(2-ethylhexyl) titanate. Suitable zirconate examples include tetra-n-propyl zirconate, tetra-n-butyl zirconate and zirconium diethylcitrate.

Alternatively, the titanate and/or zirconate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate or diisopropyldiethylacetoacetate titanate. Further chelates include aminoalcohol ester chelates such as triethanolamine titanate chelate, diethanolamine titanate or di-isopropoxy-bis-(beta-diethanolamine ethoxy) titanate. Further chelates include organic acid or salt chelates such as the ammonium salt of a lactic acid titanate chelate.

The molar ratio of M-OR functions to the hydroxyl groups is comprised between 0.01:1 and 0.6:1, where M is titanium or zirconium. When a low amount of catalyst is used, it might be beneficial premix the catalyst with the crosslinker or with an optional diluent, thus allowing for a more reliable dosing. This process is typical for a person skilled in the art, and is sometimes referred to as "masterbatch".

In some instances, the composition used to cure the material is a mixture of a condensation curable polymer (i), cross-linker (ii) and condensation catalyst (iii) as described above in combination with a hydrosilylation curable polymer together with a suitable cross-linker and hydrosilylation catalyst. Any suitable polymer curable via a hydrosilylation reaction pathway may be utilized. Such hydrosilylation curable polymers are known in the art. In some instances, the composition used to cure the material is a mixture of a condensation curable polymer (i), cross-linker (ii) and condensation catalyst (iii) as described above free of hydrosilylation curable polymer, hydrosilylation cross-linker and hydrosilylation catalyst.

The material as hereinbefore described is typically made from the condensation curable material composition which is stored in a 2 part manner, that is, in parts I and II. The two part compositions may be mixed using any appropriate standard two-part mixing equipment with a dynamic or static mixer.

Typically, the condensation curable composition is stored in two parts having polymer (i) and cross-linker (ii) in part I and polymer (i) and catalyst (iii) in part II. In some instances, the condensation curable composition is stored in two parts having cross-linker (ii) in part I and polymer (i) and catalyst (iii) in part II. In some further instances, the condensation curable composition is stored in two parts having a first polymer (i) and cross-linker (ii) in part I and a second polymer (ii) and catalyst (iii) in part II. The catalyst is typically held separate from polymers (i) and (ii) until condensation reaction is desired to start. When additives are present, these may be present in any of parts I and II or in both parts.

The condensation curable material composition based on titanate/zirconate cure catalysts can be cured to a bulk cure in a few minutes to a few weeks, alternatively in a few minutes to a few hours, depending on the composition. Typically, the curing reaction takes place at temperatures ranging of from 15 to 80° C., alternatively 20 to 50° C., alternatively 20-25° C.

In neat form, the cured silicone based material may be in the form of a gel, a branched polymer, an elastomeric structured siloxane. Neat form in the scope if the present invention means the material is comprised of the reaction product of the reactant polymer (i), crosslinker (ii) and catalyst (iii). Viscosities and consistencies of the neat material may vary. Characterization methods includes the use of a texture analyser, to assess hardness or penetration. Materials typically having a penetration positive force at 5 mm of maximum 10 g are easier to handle and are easier to emulsify. The material characterization may be carried out after reaction is fully complete, after several hours. In some instances, material characterization may be carried out after more than 7 days.

The present silicone based material cured via a condensation cure chemistry may be prepared in presence of a diluent. In such instances, the cured silicone based material may be in diluted form.

Examples of diluents include silicon containing diluents such as hexamethyldisiloxane, octamethyltrisiloxane, and other short chain linear siloxanes such as octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, cyclic siloxanes such as hexamethylcyclotrisiloxane, octamethylcyclotetrasiloxane, decamethylcyclopentasiloxane, dodecamethylcyclohexasiloxane; further polydiorganosiloxanes, optionally including aryl functional siloxanes, having a viscosity of from 500 to 12,500 mPa·s, measured at 25° C.; organic diluents such as butyl acetate, alkanes, alcohols, ketones, esters, ethers, glycols, glycol ethers, hydrocarbons, hydrofluorocarbons or any other material which can dilute the composition without adversely affecting any of the component materials. The diluent might be a mixture of two or more diluents. Hydrocarbons include isododecane, isohexadecane, Isopar L (C11-C13), Isopar H (C11-C12), hydrogenated polydecene, mineral oil, especially hydrogenated mineral oil or white oil, liquid polyisobutene, isoparaffinic oil or petroleum jelly. Ethers and esters include isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic diluents include fats, oils, fatty acids, and fatty alcohols. A mixture of diluents may also be used.

The weight ratio of silicone material to diluent can for example be 100/0 to 10/90, alternatively 70/30 to 20/80. The diluent may be added before, after or during the condensation reaction of the silicone based material occurs, although it does not contribute to or participate in the condensation reaction. For ease of handling, the diluent may be added before the condensation reaction is initiated. The diluent may be present in any or both of parts I and II.

The present silicone based material cured via a condensation cure chemistry may be provided in emulsion form, which may be prepared by any known methods, or alternatively prepared by the methods as discussed below.

The present disclosure further provides a process for preparing an emulsion by:
I) forming a mixture comprising;
   A) 100 parts by weight of silicone based material cured via a condensation cure chemistry,
   B) 0.1 to 50 parts by weight of a surfactant,
II) admixing a sufficient amount of water to the mixture from step I) to form an emulsion,
III) optionally, further shear mixing the emulsion and/or diluting of the emulsion with the continuous phase.

The amount of surfactant added in step I should be 0.1 to 50 parts by weight, alternatively 1 to 50 parts by weight, alternatively 2 to 20 parts by weight, for every 100 parts by weight of silicone based material.

Mixing in step (I) can be accomplished by any method known in the art to effect mixing of high viscosity materials. The mixing may occur either as a batch, semi-continuous, or continuous process. Mixing may occur, for example using, batch mixing equipment with medium/low shear include change-can mixers, double-planetary mixers, conical-screw mixers, ribbon blenders, double-arm or sigma-blade mixers; batch equipment with high-shear and high-speed dispersers include those made by Charles Ross & Sons (NY), Hockmeyer Equipment Corp. (NJ); batch equipment with high shear actions include Banbury-type (CW Brabender Instruments Inc., NJ) and Henschel type (Henschel mixers America, TX); centrifugal force-based, high shear mixing devices as for example Speed Mixer® (Hauschild & Co KG, Germany) . Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (N.J.); twin-screw counter-rotating extruders, two-stage extruders, twin-rotor continuous mixers, dynamic or static mixers or combinations of this equipment.

The temperature and pressure at which the mixing of step I occurs is not critical, but generally is conducted at ambient temperature (20-25° C.) and pressures. Typically, the temperature of the mixture will increase during the mixing process due to the mechanical energy associated when shearing such high viscosity materials.

Step II of the process involves admixing water to the mixture of step Ito form an emulsion. Typically 5 to 2000 parts by weight water are mixed for every 100 parts by weight of the step I mixture to form an emulsion. The water is added to the mixture from step I at such a rate, with additional mixing, so as to form an emulsion of the mixture of step I. While this amount of water can vary depending on the selection of the surfactants, generally the amount of water is from 0.1 to 2000 parts per 100 parts by weight of the step I mixture, alternatively from 5 to 500 parts per 100 parts by weight of the step I mixture, or alternatively from 5 to 100 parts per 100 parts by weight of the step I mixture.

The addition of water to the mixture from step I may be done in incremental portions, whereby each incremental portion comprises less than 30 weight % of the mixture from step I and each incremental portion of water is added successively to the previous after the dispersion of the previous incremental portion of water, wherein sufficient incremental portions of water are added to form an emulsion of the silicone based material.

Mixing in step (II) can be accomplished by any method known in the art to effect mixing of high viscosity materials. The mixing may occur either as a batch, semi-continuous, or continuous process. Any of the mixing methods as described for step (I), may be used to effect mixing in step (II). Alternatively, mixing in step (II) may also occur via those techniques known in the art to provide high shear mixing to effect formation of emulsions. Representative of such high shear mixing techniques include: homogenizers, sonolators, and other similar shear devices.

Optionally, the emulsion formed in step (II) may be further sheared according to step (III) to reduce particle size and/or improve long term storage stability. The shearing may occur by any of the mixing techniques discussed above. In some cases it might be necessary to run one or several of the steps Ito III under lower pressure or vacuum.

The present disclosure further provides a first alternative process for preparing an emulsion by;
I) forming a mixture comprising;
  A) 100 parts by weight of
    (i) at least one condensation curable silyl terminated polymer having at least one, typically at least 2 hydrolysable and/or hydroxyl functional groups per molecule;
    (ii) a cross-linker selected from silanes having at least 2 hydrolysable groups and/or silyl functional molecules having at least 2 silyl groups, each silyl group containing at least one hydrolysable group; and
    (iii) a condensation catalyst selected from the group of titanates or zirconates characterized in that the molar ratio of hydroxyl groups to hydrolysable groups is between 0.4:1 to 2:1 using a monosilane cross linker or 0.2:1 to 10:1 using disilyl cross-linker and the molar ratio of M-OR functions to the hydroxyl groups is comprised between 0.01:1 and 0.6:1, where M is titanium or zirconium;
    (iv) an optional diluent;
  B) 0.1 to 50 parts by weight of a surfactant,
II) admixing a sufficient amount of water to the mixture from step I) to form an emulsion,
III) optionally, further shear mixing the emulsion and/or diluting of the emulsion with the continuous phase,
IV) subsequently allowing the condensation cure reaction to take place after the emulsification is complete.

In this alternative process, the mixing and addition conditions remain as disclosed for the first process. The reaction conditions are also as discussed above.

The surfactant may be an anionic surfactant, cationic surfactant, nonionic surfactant, amphoteric surfactant, or a mixture of any of these surfactants.

Examples of anionic surfactants include alkali metal, amine, or ammonium salts of higher fatty acids, alkylaryl sulphonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, alkyl sarcosinates, and mixtures thereof.

Examples of cationic surfactants include alkylamine salts, quaternary ammonium salts, sulphonium salts, and phosphonium salts. Examples of suitable nonionic surfactants include condensates of ethylene oxide with long chain fatty alcohols or fatty acids such as a C12-16 alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, and mixtures thereof.

Examples of amphoteric surfactants include imidazoline compounds, alkylaminoacid salts, betaines, and mixtures thereof.

Examples of nonionic surfactants include polyoxyethylene fatty alcohols such as polyoxyethylene (23) lauryl ether, polyoxyethylene (4) lauryl ether; ethoxylated alcohols such as ethoxylated trimethylnonanol, C12-C14 secondary alcohol ethoxylates, ethoxylated, C10-Guerbet alcohol, ethoxylated, iso-C13 alcohol; poly(oxyethylene)-poly(oxypropylene)-poly(oxyethylene) tri-block copolymer (also referred to as poloxamers); tetrafunctional poly(oxyethylene)-poly(oxypropylene) block copolymer derived from the sequential addition of propylene oxide and ethylene oxide to ethylene diamine (also referred to as poloxamines), silicone polyethers, and mixtures thereof.

The emulsions of the present disclosure may be an oil/water emulsion, a water/oil emulsion, a multiple phase or triple emulsion.

In one embodiment, the emulsions of the present disclosure are oil/water emulsions. The present oil/water emulsions may be characterized by average volume particle of the dispersed (oil) phase in the continuous aqueous phase. The particle size may be determined by laser diffraction of the emulsion. Suitable laser diffraction techniques are well known in the art. The particle size is obtained from a particle size distribution (PSD). The PSD can be determined on a volume, surface, length basis. The volume particle size is equal to the diameter of the sphere that has the same volume as a given particle. The term Dv represents the average volume particle size of the dispersed particles. Dv 0.5 is the particle size measured in volume corresponding to 50% of the cumulative particle population. In other words if Dv 0.5=10 μm, 50% of the particle have an average volume particle size below 10 μm and 50% of the particle have a volume average particle size above 10 μm. Unless indicated otherwise all average volume particle sizes are calculated using Dv 0.5.

The average volume particle size of the dispersed siloxane particles in the oil/water emulsions may vary between 0.1 μm and 150 μm; or between 0.1 μm and 30 μm; or between 0.2 μm and 5.0 μm.

The present disclosure provides a second alternative process for preparing an emulsion by;
A) forming a semi-cured mixture comprising;
  (i) 100 parts by weight of at least one condensation curable silyl terminated polymer having at least one, typically at least 2 hydrolysable and/or hydroxyl functional groups per molecule;
  (ii) a cross-linker selected from silanes having at least 2 hydrolysable groups and/or silyl functional molecules having at least 2 silyl groups, each silyl group containing at least one hydrolysable group; and (iii) a condensation catalyst selected from the group of titanates or zirconates characterized in that the molar ratio of hydroxyl groups to hydrolysable groups is between 0.4:1 to 2:1 using a monosilane cross linker or 0.2:1 to 10:1 using disilyl crosslinker and the molar ratio of M-OR functions to the hydroxyl groups is comprised between 0.01:1 and 0.6:1, where M is titanium or zirconium;

(iv) an optional diluent;

(v) mixing the parts (i) to (iv) and letting cure to proceed until the penetration force F(+) as measured at 5mm penetration by TA.XT Plus Texture Analyser (available from Texture Technologies and equipped with rounded-end plastic probe) is above 1.2 g but below 4 g. Alternatively a two-fold increase in viscosity with regard to catalyst—free mix measured at 20 RPM, 20-23C at 30% relative humidity using a cone-plate Brookfield viscometer.

B) 0.1 to 50 parts by weight of a surfactant,

C) admixing a sufficient amount of water to the mixture from step A) to form an emulsion, D) optionally, further shear mixing the emulsion and/or diluting of the emulsion with the continuous phase, E) subsequently allowing the condensation cure reaction to complete upon the end of the emulsification process.

In this second alternative process, the mixing and addition conditions remain as disclosed for the first alternative process. The reaction conditions are also as discussed above.

The surfactant may be an anionic surfactant, cationic surfactant, nonionic surfactant, amphoteric surfactant, or a mixture of any of these surfactants. Examples of each of these surfactants are provided above.

The silicone material cured via a condensation cure chemistry is present in a fabric care composition in conjunction with a fabric care ingredient, optionally in an acceptable medium.

Fabric care compositions include liquid detergents, solid detergents, pre-wash treatments, fabric softeners, color care treatments and the like, used in the care of fabric and fibres, that is, any product adapted to be applied to a fibre, fabric or textile e.g. clothing, in order to improve the appearance or condition of the fabric or textile. Said fibres, or fabrics and textiles made thereof, may be of animal, vegetal or synthetic origin. Examples of animal fibres include silk and protein fibres, such as wool, angora, mohair, cashmere. Examples of vegetal fibres include cellulose or cotton fibres. Examples of synthetic fibres include polyester, nylon, spandex and rayon acetate.

Acceptable medium include water, solvents, diluents, or mixtures and emulsions thereof. Solvents include low molecular weight organic solvents that are highly soluble in water, e.g., C1-C4 monohydric alcohols, C2-C5 polyhydric alcohols including alkylene glycols, polyalkylene glycols, alkylene carbonates, and mixtures thereof. Typical solvents include ethanol, propanol, isopropanol, n-butyl alcohol, t-butyl alcohol, ethylene glycol, diethylene glycol, propylene glycol, dipropylene glycol, glycerol, propylene carbonate, and mixtures thereof.

Fabric care ingredients include surface active materials such as surfactants or detergents or emulsifiers, thickeners, water phase stabilizing agents, pH controlling agents, preservatives and biocides, proteins or amino-acids and their derivatives, pigments, colorants, silicone conditioning agents, cationic conditioning agents, non-ionic conditioning agents, hydrophobic conditioning agents, UV absorbers, sunscreen agents, dyes, fragrances or perfume, antioxidants, soil release agents, oxidizing agents, reducing agents, propellant gases, dispersibility aids, inorganic salts, antibacterial agents, antifungal agents, bleaching agents, sequestering agents, enzymes, diluents and mixtures thereof.

Additional ingredients that may be used in the fabric care compositions include antifoam compounds, builders, abrasives, fabric softeners, optical brighteners, soil-suspending agents, dispersants, dye transfer inhibitors, dye sequestrants, color fixatives, anti re-deposition agents, fatty alcohols, colour care additives, ironing agents, suspending agents and others.

Examples of surface active materials may be anionic, cationic or non-ionic, and include organomodified silicones such as dimethicone copolyol; oxyethylenated and/or oxypropylenated ethers of glycerol; oxyethylenated and/or oxypropylenated ethers of fatty alcohols such as ceteareth-30, C12-15 pareth-7; fatty acid esters of polyethylene glycol such as PEG-50 stearate, PEG-40 monostearate; saccharide esters and ethers, such as sucrose stearate, sucrose cocoate and sorbitan stearate, and mixtures thereof; phosphoric esters and salts thereof, such as DEA oleth-10 phosphate; sulphosuccinates such as disodium PEG-5 citrate lauryl sulphosuccinate and disodium ricinoleamido MEA sulphosuccinate; alkyl ether sulphates, such as sodium lauryl ether sulphate; isethionates; betaine derivatives; and mixtures thereof.

Further examples of nonionic surfactants include polyoxyethylene alkyl ethers, polyoxyethylene alkylphenol ethers, polyoxyethylene lauryl ethers, straight-chain, primary alcohol alkoxylates, straight-chain secondary alcohol alkoxylates, alkyl phenol alkoxylates, olefinic alkoxylates, branched chain alkoxylates, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene-substituted silicones (rake or ABn types), silicone alkanolamides, silicone esters, silicone glycosides, and mixtures thereof.

Nonionic surfactants include dimethicone copolyols, fatty acid esters of polyols, for instance sorbitol or glyceryl mono-, di-, tri- or sesquioleates or stearates, glyceryl or polyethylene glycol laurates; fatty acid esters of polyethylene glycol (polyethylene glycol monostearate or monolaurate); polyoxyethylenated fatty acid esters (stearate or oleate) of sorbitol; polyoxyethylenated alkyl (lauryl, cetyl, stearyl or octyl)ethers.

Anionic surfactants include carboxylates (sodium 2-(2-hydroxyalkyloxy)acetate)), amino acid derivatives (N-acylglutamates, N-acylgly-cinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, and mixtures thereof.

Amphoteric and zwitterionic surfactants include betaines, N-alkylamidobetaines and derivatives thereof, proteins and derivatives thereof, glycine derivatives, sultaines, alkyl polyaminocarboxylates and alkylamphoacetates, and mixtures thereof.

Examples of thickeners include acrylamide polymers and copolymers, acrylate copolymers and salts thereof (such as sodium polyacrylate), xanthan gum and derivatives, cellulose gum and cellulose derivatives (such as methylcellulose, methylhydroxypropylcellulose, hydroxypropylcellulose, polypropylhydroxyethylcellulose), starch and starch derivatives (such as hydroxyethylamylose and starch amylase), polyoxyethylene, carbomer, hectorite and hectorite derivatives, sodium alginate, arabic gum, cassia gum, guar gum and guar gum derivatives, cocamide derivatives, alkyl alcohols, gelatin, PEG-derivatives, saccharides (such as fructose, glucose) and saccharides derivatives (such as PEG-120 methyl glucose diolate), and mixtures thereof.

Examples of water phase stabilizing agents include electrolytes (e.g. alkali metal salts and alkaline earth salts, especially the chloride, borate, citrate, and sulfate salts of sodium, potassium, calcium and magnesium, as well as aluminum chlorohydrate, and polyelectrolytes, especially hyaluronic acid and sodium hyaluronate), polyols (glycerine, propylene glycol, butylene glycol, and sorbitol), alcohols such as ethyl alcohol, and hydrocolloids, and mixtures thereof.

Examples of pH controlling agents include any water soluble acid such as a carboxylic acid or a mineral acid such as hydrochloric acid, sulphuric acid, and phosphoric acid, monocarboxylic acid such as acetic acid and lactic acid, and polycarboxylic acids such as succinic acid, adipic acid, citric acid, and mixtures thereof.

Example of preservatives and biocides include paraben derivatives, hydantoin derivatives, chlorhexidine and its derivatives, imidazolidinyl urea, phenoxyethanol, silver derivatives, salicylate derivatives, triclosan, ciclopirox olamine, hexamidine, oxyquinoline and its derivatives, PVP-iodine, zinc salts and derivatives such as zinc pyrithione, glutaraldehyde, formaldehyde, 2-bromo-2-nitropropane-1,3-diol, 5-chloro-2-methyl-4-isothiazoline-3-one, 2-methyl-4-isothiazoline-3-one, and mixtures thereof.

Examples of proteins or amino-acids and their derivatives include those extracted from wheat, soy, rice, corn, keratin, elastin or silk. Proteins may be in the hydrolysed form and they may also be quaternized, such as hydrolysed elastin, hydrolysed wheat powder, hydrolysed silk. Examples of protein include enzymes such as hydrolases, cutinases, oxidases, transferases, reductases, hemicellulases, esterases, isomerases, pectinases, lactases, peroxidases, laccases, catalases, and mixtures thereof. Examples of hydrolases include proteases (bacterial, fungal, acid, neutral or alkaline), amylases (alpha or beta), lipases, mannanases, cellulases, collagenases, lisozymes, superoxide dismutase, catalase, and mixtures thereof.

Examples of pigments and colorants include surface treated or untreated iron oxides, surface treated or untreated titanium dioxide, surface treated or untreated mica, silver oxide, silicates, chromium oxides, carotenoids, carbon black, ultramarines, chlorophyllin derivatives and yellow ocher. Examples of organic pigments include aromatic types including azo, indigoid, triphenylmethane, anthraquinone, and xanthine dyes which are designated as D&C and FD&C blues, browns, greens, oranges, reds, yellows, etc., and mixtures thereof. Surface treatments include those treatments based on lecithin, silicone, silanes, fluoro compounds.

Examples of silicone conditioning agents include silicone oils such as dimethicone; silicone gums such as dimethiconol; silicone resins such as trimethylsiloxy silicate, polypropyl silsesquioxane; silicone elastomers; alkylmethylsiloxanes; organomodified silicone oils, such as amodimethicone, aminopropyl phenyl trimethicone, phenyl trimethicone, trimethyl pentaphenyl trisiloxane, silicone quaternium-16/glycidoxy dimethicone crosspolymer, silicone quaternium-16; saccharide functional siloxanes; carbinol functional siloxanes; silicone polyethers; siloxane copolymers (divinyldimethicone/dimethicone copolymer); acrylate or acrylic functional siloxanes; and mixtures or emulsions thereof.

Examples of cationic conditioning agents include guar derivatives such as hydroxypropyltrimethylammonium derivative of guar gum; cationic cellulose derivatives, cationic starch derivatives; quaternary nitrogen derivatives of cellulose ethers; quaternized triethanolamine esters (esterquats); homopolymers of dimethyldiallyl ammonium chloride; copolymers of acrylamide and dimethyldiallyl ammonium chloride; homopolymers or copolymers derived from acrylic acid or methacrylic acid which contain cationic nitrogen functional groups attached to the polymer by ester or amide linkages; polymeric quaternary ammonium salts of hydroxyethyl cellulose reacted with a fatty alkyl dimethyl ammonium substituted epoxide ; polycondensation products of N,N'-bis-(2,3-epoxypropyl)-piperazine or piperazine-bisacrylamide and piperazine; and copolymers of vinylpyrrolidone and acrylic acid esters with quaternary nitrogen functionality. Specific materials include the various polyquats Polyquaternium-7, Polyquaternium-8, Polyquaternium-10, Polyquaternium-11, and Polyquaternium-23. Other categories of conditioners include cationic surfactants such as cetyl trimethylammonium chloride, cetyl trimethylammonium bromide, stearyltrimethylammonium chloride, and mixtures thereof. In some instances, the cationic conditioning agent is also hydrophobically modified, such as hydrophobically modified quaternized hydroxyethylcellulose polymers; cationic hydrophobically modified galactomannan ether; and mixtures thereof.

Examples of non-ionic conditioning agents include fatty acid partial esters of polyhydric alcohols, or anhydrides thereof, where the polyhydric alcohol portion of the ester can be ethylene glycol, glycerol, poly (e.g., di-, tri-, tetra, penta-, and/or hexa-) glycerol, xylitol, sucrose, erythritol, pentaerythritol, sorbitol or sorbitan and where the fatty acid portion of the ester is derived from fatty acids having from about 12 to about 30 carbon atoms, such as lauric acid, myristic acid, palmitic acid, stearic acid and behenic acid.

Examples of hydrophobic conditioning agents include guar derivatives; galactomannan gum derivatives; cellulose derivatives; and mixtures thereof.

Examples of fabric softening compounds include cationic and non-ionic compounds. Further examples of fabric softening compounds include polyalkyl quaternary ammonium salts such as distearyldimethyl ammonium chloride, di(hardened tallow alkyl) dimethyl ammonium chloride, dipalmityl hydroxyethyl methylammonium chloride, stearyl benzyl dimethylammonium chloride, N,N-di(tallowyl-oxy-ethyl)-N-methyl, N-(2-hydroxyethyl)ammonium chloride; ester-linked quaternary ammonium materials having one or more fully saturated alkyl chains, and mixtures thereof.

UV absorbers and sunscreen agents include those which absorb ultraviolet light between about 290-320 nanometers (the UV-B region) and those which absorb ultraviolet light in the range of 320-400 nanometers (the UV-A region).

Some examples of sunscreen agents are aminobenzoic acid, cinoxate, diethanolamine methoxycinnamate, digalloyl trioleate, dioxybenzone, ethyl 4-[bis(Hydroxypropyl)] aminobenzoate, glyceryl aminobenzoate, homosalate, lawsone with dihydroxyacetone, menthyl anthranilate, octocrylene, ethyl hexyl methoxycinnamate, octyl salicylate, oxybenzone, padimate O, phenylbenzimidazole sulfonic acid, red petrolatum, sulisobenzone, titanium dioxide, trolamine salicylate, and mixtures thereof.

Some examples of UV absorbers are acetaminosalol, allatoin PABA, benzalphthalide, benzophenone, benzophenone 1-12, 3-benzylidene camphor, benzylidenecamphor hydrolysed collagen sulfonamide, benzylidene camphor sulfonic Acid, benzyl salicylate, bornelone, bumetriozole, butyl Methoxydibenzoylmethane, butyl PABA, ceria/silica, ceria/silica talc, cinoxate, DEA-methoxycinnamate, dibenzoxazol naphthalene, di-t-butyl hydroxybenzylidene camphor, digalloyl trioleate, diisopropyl methyl cinnamate, dimethyl PABA ethyl cetearyldimonium tosylate, dioctyl butamido triazone, diphenyl carbomethoxy acetoxy naphthopyran, disodium bisethylphenyl tiamminotriazine stilbenedisulfonate, disodium distyrylbiphenyl triaminotriazine stilbenedisulfonate, disodium distyrylbiphenyl disulfonate, drometrizole, drometrizole trisiloxane, ethyl dihydroxypropyl PABA, ethyl diisopropylcinnamate, ethyl methoxycinnamate, ethyl PABA, ethyl urocanate, etrocrylene ferulic acid, glyceryl octanoate dimethoxycinnamate, glyceryl PABA, glycol salicylate, homosalate, isoamyl p-methoxycinnamate, isopropylbenzyl salicylate, isopropyl dibenzolylmethane, isopropyl methoxycinnamate, menthyl anthranilate, menthyl salicylate, 4-methylbenzylidene, camphor, octocrylene, octrizole, octyl dimethyl PABA, ethyl hexyl methoxycinnamate, octyl salicylate, octyl triazone, PABA, PEG-25 PABA, pentyl dimethyl PABA, phenylbenzimidazole sulfonic acid, polyacrylamidomethyl benzylidene camphor, potassium methoxycinnamate, potassium phenylbenzimidazole sulfonate, red petrolatum, sodium phenylbenzimidazole sulfonate, sodium urocanate, TEA-phenylbenzimidazole sulfonate, TEA-salicylate, terephthalylidene dicamphor sulfonic acid, titanium dioxide, tri-PABA panthenol, urocanic acid, VA/crotonates/methacryloxybenzophenone-1 copolymer, and mixtures thereof.

A dye may generally be described as a coloured substance that has an affinity to the substrate to which it is being applied. Examples of dyes include anionic dyes (for example a direct dye or an acid dye), reactive dyes, nonionic dyes (for example a disperse dye) or pigment dyes (for example a vat dye). Direct dyes are generally large, planar, aromatic systems generally used to dye cotton, for example direct red 80 or direct black 56. Reactive dyes are medium sized generally used for cotton and wool having fibre-reactive terminal group which forms a covalent bond with an atom of the fabric, for example remazol brilliant blue R and procion blue 3G. Disperse dyes are compact, aromatic molecules used for polyester, or dark shades on nylon and include disperse blue 11. Vat dyes are used for cotton, mainly prints and denims. The water-soluble reduced form is oxidised in situ to form the insoluble dye. Examples include vat blue 4. Further examples of dyes include indigo extract, Lawsonia inermis (Henna) extract, 1-acetoxy-2-methylnaphthalene; 5-amino-4-chloro-o-cresol; 5-amino-2, 6-dimethoxy-3-hydroxypyridine; 3-amino-2,6-dimethylphenol; 2-amino-5-ethylphenol HCl; 5-amino-4-fluoro-2-methylphenol sulfate; 4-amino-2-nitrophenol; 4-amino-3-nitrophenol; 2-amino-4-nitrophenol sulfate; m-aminophenol HCl; p-aminophenol HCl; m-aminophenol; o-aminophenol; 4,6-bis(2-hydroxyethoxy)-m-phenylenediamine HCl; 2-chloro-5-nitro-N-hydroxyethyl p-phenylenediamine; 2-chloro-p-phenylenediamine; 3,4-diaminobenzoic acid; 4,5-diamino-1-((4-chlorophenyl)methyl)-1H-pyrazole-sulfate; 2,3-diaminodihydropyrazolo pyrazolone dimethosulfonate; 2,6-diaminopyridine; 2,6-diamino-3-((pyridin-3-yl)azo)pyridine; dihydroxyindole; dihydroxyindoline; N,N-dimethyl-p-phenylenediamine; 2,6-dimethyl-p-phenylenediamine; N,N-dimethyl-p-phenylenediamine sulfate; direct dyes; 4-ethoxy-m-phenylenediamine sulfate; 3-ethylamino-p-cresol sulfate; N-ethyl-3-nitro PABA; gluconamidopropyl aminopropyl dimethicone; Haematoxylon brasiletto wood extract; HC dyes; hydroxyethyl-3,4-methylenedioxyaniline HCl; hydroxyethyl-2-nitro-p-toluidine; hydroxyethyl-p-phenylenediamine sulfate; 2-hydroxyethyl picramic acid; hydroxypyridinone; hydroxysuccinimidyl C21-22 isoalkyl acidate; isatin; Isatis tinctoria leaf powder; 2-methoxymethyl-p-phenylenediamine sulfate; 2-methoxy-p-phenylenediamine sulfate ; 6-methoxy-2,3-pyridinediamine HCl; 4-methylbenzyl 4,5-diamino pyrazole sulfate; 2,2'-methylenebis 4-aminophenol; 2,2'-methylenebis-4-aminophenol HCl; 3,4-methylenedioxyaniline; p-phenylenediamine sulfate; phenyl methyl pyrazolone; N-phenyl-p-phenylenediamine HCl; pigment blue 15:1; pigment violet 23; pigment yellow 13; pyrocatechol; pyrogallol; resorcinol; sodium picramate; sodium sulfanilate; solvent yellow 85; solvent yellow 172; tetraaminopyrimidine sulfate; tetrabromophenol blue; 2,5,6-triamino-4-pyrimidinol sulfate; 1,2,4-trihydroxybenzene ; and mixtures thereof.

Examples of fragrances or perfume include hexyl cinnamic aldehyde; anisaldehyde; methyl-2-n-hexyl-3-oxo-cyclopentane carboxylate; dodecalactone gamma; methylphenylcarbinyl acetate; 4-acetyl-6-tert-butyl-1 ,1-dimethyl indane; patchouli; olibanum resinoid; labdanum; vetivert; copaiba balsam; fir balsam; 4-(4-hydroxy-4-methyl pentyl)-3-cyclohexene-1-carboxaldehyde; methyl anthranilate; geraniol; geranyl acetate; linalool; citronellol; terpinyl acetate; benzyl salicylate; 2-methyl-3-(p-isopropylphenyl)-propanal; phenoxyethyl isobutyrate; cedryl acetal; aubepine; musk fragrances; macrocyclic ketones; macrolactone musk fragrances; ethylene brassylate; and mixtures thereof. Further perfume ingredients are described in detail in standard textbook references such as *Perfume and Flavour Chemicals,* 1969, S. Arctander, Montclair, N.J.

Examples of antioxidants are acetyl cysteine, arbutin, ascorbic acid, ascorbic acid polypeptide, ascorbyl dipalmitate, ascorbyl methylsilanol pectinate, ascorbyl palmitate, ascorbyl stearate, BHA, p-hydroxyanisole, BHT, t-butyl hydroquinone, caffeic acid, Camellia sinensis Oil, chitosan ascorbate, chitosan glycolate, chitosan salicylate, chlorogenic acids, cysteine, cysteine HCl, citric acid, decyl mercaptomethylimidazole, erythorbic acid, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, isoquercitrin, diosmine, disodium ascorbyl sulfate, disodium rutinyl disulfate, distearyl thiodipropionate, ditridecyl thiodipropionate, dodecyl gallate, ethyl ferulate, ferulic acid, hydroquinone, hydroxylamine HCl, hydroxylamine sulfate, isooctyl thioglycolate, isopropyl citrate, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycolic acid, phloroglucinol, potassium ascorbyl tocopheryl phosphate, thiodiglycolamide, potassium sulfite, propyl gallate, rosmarinic acid, rutin, sodium ascorbate, sodium ascorbyl/cholesteryl phosphate, sodium bisulfite, sodium erythorbate, sodium metabisulfide, sodium sulfite, sodium thioglycolate, sorbityl furfural, tea tree (Melaleuca aftemifolia) oil, diethylenetriaminepentaacetic acid, tocopheryl acetate, tetrahexyldecyl ascorbate, tetrahydrodiferuloylmethane, tocopheryl linoleate/oleate, thiodiglycol, tocopheryl succinate, thiodiglycolic acid, thioglycolic acid, thiolactic acid, thiosalicylic acid, thiotaurine, retinol, tocophereth-5, tocophereth-10, tocophereth-12, tocophereth-18, tocophereth-50, tocopherol, tocophersolan, tocopheryl linoleate, tocopheryl nicotinate, tocoquinone, o-tolyl biguanide, tris(nonylphenyl) phosphite, ubiquinone, zinc dibutyldithiocarbamate, and mixtures thereof.

Examples of soil release agents include copolymeric blocks of terephthalate and polyethylene oxide or polypropylene oxide, and the like.

Examples of oxidizing agents are ammonium persulfate, calcium peroxide, hydrogen peroxide, magnesium peroxide, melamine peroxide, potassium bromate, potassium caroate, potassium chlorate, potassium persulfate, sodium bromate, sodium carbonate peroxide, sodium chlorate, sodium iodate, sodium perborate, sodium persulfate, strontium dioxide, strontium peroxide, urea peroxide, zinc peroxide, and mixtures thereof.

Examples of reducing agents are ammonium bisufite, ammonium sulfite, ammonium thioglycolate, ammonium thiolactate, cystemaine HCl, cystein, cysteine HCl, ethanolamine thioglycolate, glutathione, glyceryl thioglycolate, glyceryl thioproprionate, hydroquinone, p-hydroxyanisole, isooctyl thioglycolate, magnesium thioglycolate, mercaptopropionic acid, potassium metabisulfite, potassium sulfite, potassium thioglycolate, sodium bisulfite, sodium hydrosulfite, sodium hydroxymethane sulfonate, sodium metabisulfite, sodium sulfite, sodium thioglycolate, strontium thioglycolate, superoxide dismutase, thioglycerin, thioglycolic acid, thiolactic acid, thiosalicylic acid, zinc formaldehyde sulfoxylate, and mixtures thereof.

Examples of propellant gases include carbon dioxide, nitrogen, nitrous oxide, volatile hydrocarbons such as butane, isobutane, or propane, and chlorinated or fluorinated hydrocarbons such as dichlorodifluoromethane and dichlorotetrafluoroethane or dimethylether; and mixtures thereof. Dispersibility aids may be used to facilitate dispersion of the compositions in the rinse water.

Examples of dispersibility aids include those selected from the group consisting of mono-alkyl cationic quaternary ammonium compounds, mono-alkyl amine oxides, and mixtures thereof.

Examples of inorganic salts include any inorganic salt known in the art for addition to fabric softener compositions. Non-limiting examples of suitable inorganic salts include: Mgl2, MgBr2, MgCl2, Mg(N03) 2,Mg3 (PO4) 2,Mg2P207, MgS04, magnesium silicate, Nal, NaBr, NaCl, NaF, Na3 (PO4),NaS03,Na2S04, Na2S03, NaN03,Nal03, Na3 (PO4), Na4P207, sodium silicate, sodium metasilicate, sodium tetrachloroaluminate, sodium tripolyphosphate (STPP), Na2Si307, sodium zirconate, CaF2,CaCl2, CaBr2,Cal2, CaS04, Ca(N03)2, Ca, Kl, KBr,KC1, KF, KN03,KlO3, K2SO4,K2SO3, K3(P04), K4(P207), potassium pyrosulfate, potassium pyrosulfite, Lil, LiBr, LiCl, LiF,LiNO3,A1F3, AlCl3, AlBr3,Alls, A12(SO4) 3, A1(PO4), Al (NO3) 3, aluminum silicate; including hydrates of these salts and including combinations of these salts or salts with mixed cations e. g. potassium alum AlK(SO4) 2 and salts with mixed anions, e. g. potassium tetrachloroaluminate and sodium tetrafluoroaluminate. Salts incorporating cations from groups IIIa, IVa, Va, VIa,VIIa, VIII, Ib, and IIb on the periodic chart with atomic numbers>13 are also useful in reducing dilution. Salts with cations from group la or IIa with atomic numbers>20 as well as salts with cations from the lactinide or actinide series are useful in reducing dilution viscosity, and mixtures thereof.

Examples of antibacterial agents include chlorohexadiene gluconate, alcohol, benzalkonium chloride, benzethonium chloride, hydrogen peroxide, methylbenzethonium chloride, phenol, poloxamer 188, povidone-iodine, and mixtures thereof.

Examples of antifungal agents include miconazole nitrate, calcium undecylenate, undecylenic acid, zinc undecylenate, and mixtures thereof.

Examples of bleaching agents include chlorine bleaches such as chlorine, chlorine dioxide, sodium hypochlorite, calcium hypochlorite, sodium chlorate; peroxide bleaches such as hydrogen peroxide, sodium percarbonate, sodium perborate; reducing bleaches such as sodium dithionite, sodium borohydride; ozone; and mixtures thereof.

Examples of sequestering agents (also chealting agents) include phosphonates; amino carboxylic acid compounds (such as ethylenediamine tetraacetic acid (EDTA); N-hydroxyethylenediamine triacetic acid; nitrilotriacetic acid (NTA); and diethylenetriamine pentaacetic acid (DEPTA)); organo aminophosphonic acid compounds (such as ethylenediamine tetrakis (methylenephosphonic acid); 1-hydroxyethane 1,1-diphosphonic acid (HEDP); and aminotri (methylenephosphonic acid)); and mixtures thereof Examples of enzymes include lipases, cellulases, proteases, amylases, mannanases, pectate lyases, and mixtures thereof.

The formulations of the present invention also include diluents. Such diluents are often necessary to decrease the viscosity of the formulation sufficiently for application. The diluents of the fabric care composition may be the same or different from the optional diluent discussed above in the frame of the condensation cure of silicone based material.

Examples of diluents include silicon containing diluents such as hexamethyldisiloxane, octamethyltrisiloxane, and other short chain linear siloxanes such as octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, cyclic siloxanes such as hexamethylcyclotrisiloxane, octamethylcyclotetrasiloxane, decamethylcyclopentasiloxane, dodecamethylcyclohexasiloxane; organic diluents such as butyl acetate, alkanes, alcohols, ketones, esters, ethers, glycols, glycol ethers, hydrofluorocarbons or any other material which can dilute the formulation without adversely affecting any of the component materials of the cosmetic composition. Hydrocarbons include isododecane, isohexadecane, Isopar L (C11-C13), Isopar H (C11-C12), hydrogenated polydecene. Ethers and esters include isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic diluents include fats, oils, fatty acids, and fatty alcohols.

Further materials suitable for fabric care composition are well known to the person skilled in the art and are described in many text books as well as other publications.

The general level of material in the fabric care compositions may vary from 0.1% to 50% by weight, alternatively from 0.1% to 20%, alternatively from 0.5% to 10%, alternatively from 0.5% to 5%, alternatively from 0.5% to 2%, relative to the total weight of the fabric care composition. The fabric care ingredient is present at a level of from 0.01% to 99.99% by weight, relative to the total weight of the fabric care composition. The fabric care ingredient may be a mixture of fabric care ingredients as listed above.

In some instances, the material is used in conjunction with a fabric care ingredient selected from cationic conditioning agent, non-ionic conditioning agent, hydrophobic conditioning agent, and mixtures thereof.

The fabric care composition may be prepared by a process comprising the steps of
i. Mixing a silicone material
ii. and at least one fabric care ingredient,
iii. optionally in the presence of an acceptable medium.

The fabric care compositions may be prepared by mixing the silicone based material in the appropriate phase of the final fabric care composition.

When the silicone based material is used in its neat form, it may be added in the hydrophobic phase. In some events, the hydrophobic phase may be a single phase, that is, a monophasic system, or anhydrous system. In some events, a second hydrophilic or aqueous phase may be mixed with the hydrophobic phase to provide for a dispersion or emulsion.

When the silicone based material is used in emulsion form, it may be mixed with the aqueous phase ingredients and optionally subsequently mixed with an optional second hydrophobic phase. When there are multiple phases, the different phases may subsequently be mixed together, optionally under heating.

The process may be conducted at temperatures ranging of from 15 to 90° C., alternatively of from 20 to 60° C., alternatively at room temperature (25° C.), using simple propeller mixers, counter-rotating mixers, or homogenizing mixers. No special equipment or processing conditions are typically required. Depending on the type of composition prepared, the method of preparation will be different, but such methods are well known in the art.

The fabric care compositions comprising the silicone based material may be adapted for use in a washing machine or for use when hand washing. The fabric care compositions according to the present invention may be in liquid, paste, laundry bar, or granular form. Other forms of the fabric care compositions include creams, gels, foams, sprays or aerosols. The fabric care compositions may be in the form of monophasic systems, biphasic or alternate multi phasic systems; emulsions, e.g. oil-in-water, water-in-oil, silicone-in-water, water-in-silicone; multiple emulsions, e.g. oil-in-water-in-oil, polyol-in-silicone-in-water, oil-in-water-in-silicone.

A laundry process is necessary in order to remove dirt, stains and malodours from fabrics or textiles, in particular clothes and household fabrics. However, the laundry process involves harsh conditions which often result in damage to the fabric such as fabric pilling, shrinkage and loss of color intensity and/or loss of color definition.

A fabric-softening composition may be used in the laundry process to prevent static cling in a laundered fabric and thereby make the fabric softer. Color-care additive are meant to retain the integrity of its color, for example the intensity and shade of color of the fabric.

The silicone based material may be used in a liquid, pourable form, or may be granulated/agglomerated to be combined in solid fabric care compositions. When provided in a granular form, the granular compositions may be made by combining base granule ingredients, e. g., surfactants, builders, water, etc., as a slurry, and spray drying the resulting slurry to a low level of residual moisture (5-12%). In some instances, additional ingredients may be added during the granulation process such as color-care additive, fragrances.

The fabric care compositions may be prepared by admixing the silicone based material with other liquid ingredients of the fabric care compositions. When solid, the fabric care compositions may be prepared by admixing the granulated form of the bi-modal water continuous emulsions (E) with the further ingredients, or by spray drying/agglomerating liquid fabric care compositions comprising the silicone based material.

Benefits obtained from using a fabric care composition comprising the silicone based material include one or more of the following benefits: fabric softening and/or feel enhancement, garment shape retention and/or recovery and/or elasticity, ease of ironing, color care, anti-abrasion, anti-pilling, silicone deposition, water absorbency, reduction and/or removal and/or prevention of wrinkles fabric enhancement (or conditioning), or any combination thereof. In a dying process, benefits include color fastness, color absorbency, color long lasting.

The invention also comprises a method of treating fabric substrates and fibres, by applying to it a fabric care composition according to the first aspect of the invention.

A process of washing fabric substrates and fibres comprises the steps of
i. Mixing a silicone based material with at least one fabric care ingredient optionally in the presence of an acceptable medium,
ii. Applying the mixture to the fabric substrates and fibres;
iii. Optionally let the mixture stand on the fabric substrates and fibres;
iv. Optionally rinsing the fabric substrates and fibres.

A process of conditioning fabric substrates and fibres comprises the steps of
i. Mixing a silicone based material with at least one fabric care ingredient optionally in the presence of an acceptable medium;
ii. Applying the mixture to the fabric substrates and fibres;
iii. Optionally let the mixture stand on the fabric substrates and fibres;
iv. Optionally rinsing the fabric substrates and fibres.

The optional standing time of the process of caring or conditioning fabric substrates and fibres may range of from 10 seconds to 24 hours, alternatively of from 10 minutes to 12 hours, alternatively of from 10 minutes to 3 hours, alternatively of from 10 minutes to 1 hour.

In one embodiment, the present invention provides for the use of the present fabric care composition to care for fabric substrates, that is to cleanse, to condition, to refresh fabric.

EXAMPLES

The following examples are included to demonstrate preferred embodiments of the invention. Unless otherwise indicated, all recipes are in mass parts, therefore the sum is not necessarily 100.

Examples of Silicone Based Gel Cured Via a Condensation Cure Chemistry (G)=Example Materials Unless stated otherwise, all experiments were made at ambient conditions, that is temperature of 23° C.±1° and approx. 30% relative humidity. All numbers relating to the condensation cure composition are mass parts.

Typically 80-90 g of condensation cure silicone based material cured via a condensation cure chemistry are prepared using the following protocol: the linear OH-terminated polydimethyl siloxane(s) was mixed with the cross-linker (x-linker) and with the optional diluent, using a speed mixer DAC 150.1 FV (available from Hauschield, Germany) at 3000 RPM for 30s. The catalyst, typically tetra-butyl titanate (TNBT), was then added and the mixture was stirred again for 90 seconds at maximum speed using the same device. Thus obtained material was left in an open container at ambient conditions for 1 to 3 weeks to allow for full cure. Unless stated otherwise all compositions were crystal clear polymers or gels.

Cure was characterized using a TA.XT Plus Texture Analyser, available from Texture Technologies and equipped with rounded-end plastic probe. The latter was approached to the surface of the cure material at given speed until reaching certain penetration depth. At maximum penetration (in this case 5 mm), one records the maximal positive force, hereafter abbreviated as F(+). The higher F(+) the harder the material. The probe is then retracted until it is fully detached from the material. During retraction, the maximum adhesion force is measured. The adhesion force is abbreviated hereafter as F(−). With the onset of cure, the F(+) starts to increase and reaches a plateau when fully cured. The cure is deemed completed when the time variation in F(+) is less than 15%. The lower the F(+) the more flowable the material. The integration of the F(−) curve produces the adhesion energy. The value is standardly calculated by the software of the instrument. The higher the absolute value the stronger the adhesion. Particularly interesting are materials which present the combination of F(+) below 10 g, F(−) higher than −10 g and adhesion energy—the domain −200 to −80. These materials are characterized with high stringiness and ability to form filaments; said filaments detach cleanly from the probe.

For the purpose of this invention, "flowable" is defined as follows: the condensation cure silicone based material is prepared in a shallow aluminium dish (ca 5 cm in diameter, 1 cm depth). Upon full cure, the dish is held inclined at an angle of 90° C. with respect to its normal orientation approximately 15 cm above the lab balance, and the material is allowed to flow. The time (t(flow)) to pour (as measured by the balance) 1 g of cured material has been measured. When t(flow) is less that 3 minutes, the material is deemed flowable. Obviously more flowable materials are characterized by lower t(flow). Less flowable material are deemed useful in the scope of the present invention, as long as their handling allows for dispersion and miscibility with other ingredients of the fabric care composition.

Following abbreviations are used in the tables below:

Polymer type 1: α,ω-Dihydroxy polydimethyl siloxane with viscosity at 23° C. of 2,000 mPa·s (viscosity measured using a Brookfield cone plate viscometer RV DIII using a cone plate CP-52 at 20 rpm), Mn of 22,000, SiOH content=2*100*1000/22000=9.09 mmol/100 g Polymer type 5: α,ω-Dihydroxy polydimethyl siloxane with viscosity at 23° C. of 13,500 mPa·s (viscosity measured using a Brookfield cone plate viscometer RV DIII using a cone plate CP-52 at 5 rpm), Mn of 43,000, SiOH content=2*100*1000/43000=4.65 mmol/100 g Polymer type P: α,ω-Dihydroxy polydimethyl siloxane with viscosity at 23° C. of 50,000 mPa·s (viscosity measured using a Brookfield cone plate viscometer RV DIII using a cone plate CP-52 at 0.55 rpm), Mn of 63,000, SiOH content=2*100*1000/63000=3.17 mmol/100 g TEOS: tetraethoxy silane X-linker E: W—B—W type polymer where W is $(EtO)_3$—Si-D-, B is $[SiO_2(CH_3)_2]_{800-900}$, D is $C_2H_4$, having a viscosity at 23° C. of 50,000 mPa·s (viscosity measured using a Brookfield cone plate viscometer RV DIII using a cone plate CP-52 at 3 rpm), Mn of 66,000

TNBT=tetra n-butyl titanate, commercially available as Tyzor ® TNBT from Dorf Ketal Diluent (where used) were abbreviated as follows:

200 fluid 5 cSt: trimethyl end-capped polydimethyl siloxane with viscosity of 5 cSt at 23° C. commercially available from Dow Corning under the trade name Dow Corning ® 200 fluid 5 cSt (about 5 mPa·s)

200 fluid 100 cSt: trimethyl end-capped polydimethyl siloxane with viscosity of 100 cSt at 23° C. commercially available from Dow Corning under the trade name Dow Corning ® 200 fluid 100 cSt (about 100 mPa·s)

200 fluid 2 cst: trimethyl end-capped polydimethyl siloxane with viscosity of 2 cSt at 23° C. commercially available from Dow Corning under the trade name Dow Corning ® 200 fluid 2 sct . This material is volatile and when used as diluent the inventors have topped-up the material with the amount of evaporated diluent on a daily basis.

Lytol: light mineral oil commercially available as Lytol™ from Sonneborn.

Example Materials 1 to 4 are disclosed in Table 1.

TABLE 1

| Reactant | Example material 1 | Example material 2 | Example material 3 | Example material 4 |
| --- | --- | --- | --- | --- |
| polymer type 1 | 100.00 | 100.00 | — | — |
| polymer type 5 | — | — | 100.00 | 100.00 |
| TEOS | 1.00 | 1.00 | 0.51 | 0.51 |
| TNBT | 0.20 | 0.20 | 0.11 | 0.11 |
| 200 fluid* 5 cSt | — | 100.00 | — | 100.00 |
| F(+)- after 3 weeks [g] | 521.7 | 13.0 | 533.4 | 2.6 |
| F(−) after 3 weeks [g] | −52.0 | −5.4 | −151.4 | −2.6 |
| t(flow) | >5 min | >5 min | >5 min | >5 min |

Example Materials 5 to 8 are disclosed in Table 2.

TABLE 2

| Reactant | Example material 5 | Example material 6 | Example material 7 | Example material 8 |
| --- | --- | --- | --- | --- |
| X-linker E | 150.00 | 300.00 | 150.00 | 150.00 |
| polymer type 1 | — | — | 74.50 | 74.50 |
| polymer type 5 | 146.00 | 146.00 | — | — |
| TNBT | 0.15 | 0.15 | 0.15 | 0.15 |
| 200 fluid* 5 cSt | — | 250.00 | — | 250.00 |
| F(+)- after 3 weeks [g] | 964.7 | 113.4 | 1581.5 | 115.4 |
| F(−) after 3 weeks [g] | −21.5 | −8.3 | −33.7 | −8.1 |
| t(flow) | >5 min | >5 min | >5 min | >5 min |

Example Materials 9 to 14 are disclosed in Table 3.

TABLE 3

| Reactant | Example material 9 | Example material 10 | Example material 11 | Example material 12 | Example material 13 | Example material 14 |
|---|---|---|---|---|---|---|
| X-linker E | 10.00 | 5.00 | 20.00 | 10.00 | 30.00 | 15.00 |
| polymer type 5 | 100.00 | 100.00 | 100.00 | 100.00 | 100.00 | 100.00 |
| TNBT | 0.10 | 0.10 | 0.20 | 0.20 | 0.25 | 0.25 |
| 200 fluid* 5 cSt | — | — | 100.00 | 100.00 | 200.00 | 200.00 |
| F(+)- after 3 weeks [g] | 4.6 | 2.0 | 2.3 | 1.1 | 2.3 | 1.2 |
| F(−) after 3 weeks [g] | −3.6 | −2.4 | −2.5 | −2.6 | −5.1 | −2.6 |
| Adhesion energy after 3 weeks (AU) | 86.9 | | | 0.1 | 167 | 0 |
| t(flow) | | | 2 min 35 sec | 25 sec | >3 min | |

Example Materials 15 to 17 are disclosed in Table 4.

TABLE 4

| Reactant | Example material 15 | Example material 16 | Example material 17 |
|---|---|---|---|
| X-linker E | 10.00 | 20.00 | 30.00 |
| polymer type P | 200.00 | 200.00 | 200.00 |
| TNBT | 0.20 | 0.25 | 0.30 |
| 200 fluid* 5 cSt | — | 200.00 | 400.00 |
| F(+)- after 3 weeks [g] | 7.7 | 1.2 | 1.2 |
| F(−) after 3 weeks [g] | −6.5 | −2.6 | −2.6 |
| Adhesion energy after 3 weeks (AU) | 98 | 0.1 | 0.1 |
| t(flow) | — | — | 4 sec |

Example Materials 18 to 23 are disclosed in Table 5.

TABLE 5

| Reactant | Example material 18 | Example material 19 | Example material 20 | Example material 21 | Example material 22 | Example material 23 |
|---|---|---|---|---|---|---|
| X-linker E | 50.00 | 20.00 | 100.00 | 40.00 | 150.00 | 60.00 |
| polymer type 5 | 100.00 | 100.00 | 100.00 | 100.00 | 100.00 | 100.00 |
| TNBT | 0.11 | 0.11 | 0.20 | 0.20 | 0.25 | 0.25 |
| 200 fluid* 5 cSt | — | — | 100.00 | 100.00 | 200.00 | 200.00 |
| F(+)- after 3 weeks [g] | 311.1 | 24.5 | 165.3 | 24.9 | 61.8 | 24.6 |
| F(−) after 3 weeks [g] | −38.6 | −34.2 | −10.5 | −14.2 | −6.9 | −5.5 |
| Adhesion energy after 3 weeks (AU) | 67.8 | 27.3 | 14.0 | 71.3 | 12.2 | 14.6 |

Example Materials 24 to 26 are disclosed in Table 6.

TABLE 6

| Reactant | Example material 24 | Example material 25 | Example material 26 |
|---|---|---|---|
| X-linker E | 20.00 | 40.00 | 60.00 |
| polymer type P | 200.00 | 200.00 | 200.00 |
| TNBT | 0.20 | 0.25 | 0.35 |
| 200 fluid* 5 cSt | — | 200.00 | 400.00 |
| F(+)- after 3 weeks [g] | 17.5 | 4.1 | 3.9 |
| F(−) after 3 weeks [g] | −15.3 | −7.0 | −5.8 |
| Adhesion energy after 3 weeks (AU) | 718 | 218 | 60 |

Example Materials 27 to 29 are disclosed in Table 7.

TABLE 7

| Reactant | Example material 27 | Example material 28 | Example material 29 |
|---|---|---|---|
| X-linker E | 100.00 | 300.00 | 226.30 |
| polymer type 5 | 100.00 | 100.00 | 100.00 |
| TNBT | 0.20 | 0.20 | 0.35 |
| 200 fluid* 5 cSt | 200.00 | 200.00 | 300.00 |
| F(+)- after 3 weeks [g] | 6.4 | 1.1 | 1.4 |
| F(−) after 3 weeks [g] | −6.4 | −2.7 | −3.6 |
| Adhesion energy after 3 weeks (AU) | 34.6 | 22.8 | 0.1 |

Example Materials 30 to 35 are disclosed in Table 8.

TABLE 8

| Reactant | Example material 30 | Example material 31 | Example material 32 | Example material 33 | Example material 34 | Example material 35 |
|---|---|---|---|---|---|---|
| X-linker E | 20.00 | 40.00 | 30.00 | 60.00 | 100.00 | 300.00 |
| polymer type 5 | 100.00 | 100.00 | 100.00 | 100.00 | 100.00 | 100.00 |
| TNBT | 0.20 | 0.20 | 0.25 | 0.25 | 0.20 | 0.25 |
| LYTOL | 100.00 | 100.00 | 200.00 | 200.00 | 200.00 | 200.00 |
| F(+)- after 3 weeks [g] | 1.8 | 18.2 | 3.5 | 23.0 | 1.6 | 1.1 |
| F(−) after 3 weeks [g] | −2.4 | −11.7 | −4.5 | −4.2 | −4.2 | −2.7 |
| t(flow), min | >2 min 40 sec | — | — | >5 min | — | — |
| Adhesion energy after 3 weeks (AU) | 0.1 | 67.7 | 318 | 17 | 73.7 | 0.1 |
| Appearance | — | — | Turbid | Turbid | — | — |

Example Materials 36 to 38 are disclosed in Table 9.

TABLE 9

| Reactant | Example material 36 | Example material 37 | Example material 38 |
|---|---|---|---|
| X-linker E | 100.00 | 300.00 | 226.30 |
| polymer type 5 | 100.00 | 100.00 | 100.00 |
| TNBT | 0.20 | 0.20 | 0.35 |
| 200 fluid* 100 cSt | 200.00 | 200.00 | 300.00 |
| F(+)- after 3 weeks [g] | 80.927 | 61.8 | 220.2 |
| F(−) after 3 weeks [g] | −6.077 | −24.1 | −5.1 |

Example Materials 39 to 44 are disclosed in Table 10.

TABLE 10

| Reactant | Example material 39 | Example material 40 | Example material 41 | Example material 42 | Example material 43 | Example material 44 |
|---|---|---|---|---|---|---|
| X-linker E | | 30.0 | 15.0 | 30.0 | 40.0 | 60.0 |
| polymer type 5 | 100.00 | 100.00 | 100.00 | | | |
| polymer type P | | | | 200.00 | 200.00 | 200.00 |
| TEOS | 0.51 | | | | | |
| TNBT | 0.11 | 0.25 | 0.25 | 0.30 | 0.25 | 0.35 |
| 200 fluid, 2 cst | 100.00 | 200.00 | 200.00 | 400.00 | 200.00 | 400.00 |
| F(+)- after 3 weeks [g] | | 3.4 | 1.1 | 1.2 | 8.8 | |
| F(−) after 3 weeks [g] | | −6.6 | −2.5 | −2.6 | −12.4 | |
| Adhesion (AU) after 3 weeks | | 168 | 0.1 | 0.1 | 154 | |

The evolution of the material properties of selected example materials are shown in Table 11.

TABLE 11

| | Example material 11 | Example material 13 | Example material 15 |
|---|---|---|---|
| F(+) day 0 | 1.0 | 1.1 | 1.0 |
| F(−) day 0 | −1.2 | −1. | −1.4 |
| Adhesion energy, Day 0 | 0.1 | 0.1 | 0.1 |
| F(+) day 7 | 2.2 | 2.0 | 7.2 |
| F(−) day 7 | −2.4 | −3.7 | −5.8 |
| Adhesion energy, Day 7 | 0.1 | 78.6 | 83.6 |
| F(+) day 14 | 2.3 | 2.3 | 7.5 |
| F(−) day 14 | −3.2 | −5.0 | −6.2 |
| Adhesion energy, Day 14 | 204.0 | 138.5 | 102.2 |
| F(+) day 21 | 2.3 | 2.3 | 7.7 |
| F(−) day 21 | −2.5 | −5.1 | −6.5 |
| Adhesion energy, Day 21 | 0.1 | 167.0 | 98.0 |
| F(+) day 28 | 2.5 | 2.5 | 7.7 |
| F(−) day 28 | −2.4 | −5.3 | −6.4 |
| Adhesion energy, Day 28 | 0.1 | 219.6 | 100.8 |
| F(+) day + 1 year | 3.7 | 2.5 | 12.8 |
| F(−) day + 1 year | −3.0 | −3.7 | −9.7 |
| Adhesion energy, + 1 year | 15 | 240 | 132 |

Example Material 45 and Comparative Material 1

An emulsion was prepared as follows: 30 g of Polymer Type 1 was combined with 1.5 g of C11-15 Pareth-40 (70% active in water), 0.75 g of C11-15 Pareth-5 (100% active) and 3 g water, and mixed twice using a dental mixer at 3540 rpm for 30 second (each time), forming a satisfying emulsion, which was further diluted with 12.5 g water to form a final emulsion containing 60% active of Polymer Type 1.

The final emulsion was then split in two parts to provide for the Emulsion of Example material 45 and for Comparative material 1 as follows: Comparative material 1 consists in the emulsion left to dry, in absence of any catalyst; while for the Emulsion of Example material 45, an amount of 2% of triethanolamine titanium complex with 80% active ingredient in alcohol was added to the selected part of the final emulsion and also left to dry for 2 days at room temperature.

After drying, no film is observed for the Comparative material 1 which indicates no polymer was formed and that no reaction took place. On the other hand, for Example material 45, a thick film was formed indicating the reaction took place in the emulsion droplet.

Fabric Care Composition Examples Softness Testing

The silicone based materials were evaluated for their impact on softness of terry towels, prepared as per the below method:

A 1 kg fabric load composed of 4 little terry towels (further used for panel test)+5 pillow cases (as ballast-recycled) is washed and treated with a softening composition, and line dried overnight before being used for panel test.

Test conditions:
Washing Machine: Miele W377
Water Hardness: 0 dH
Water quantity: not fixed
Detergent powder: Dash powder (10 g)—Added in the drum of the washing machine
Fabric softener: lab made dispersion of esterquat at 16% in water, to which is added the amount of emulsion of silicone based material or comparative system at the level of active indicated in Table 1, under mixing using a magnetic stirrer during 5 min, 24 h before the test
6 g of prepared fabric softening composition are then placed in the softener compartment of the washing machine, which will dispense the composition automatically at the last rinse
Panel test: 16 assessors are asked to indicate which terry towel is the softest, when presented with 2 terry towels treated with different softening compositions

TABLE 12

Test Comparison

| Emulsion of example material 22 - 1% active silicone | Comparative emulsion containing a commercial silicone softening agent - 1% active silicone | Equivalent softness performance, with trend for softness improvement for the emulsion of Example material 22 |
| --- | --- | --- |

A second test (equivalent conditions as first test here above) was conducted for the evaluation of emulsions of the Example material 42: the emulsion was prepared as follows: 30 g of Example material 42 was combined with 1.5 g of 011-15 Pareth-40 (70% active in water), and 0.75 g of 011-15 Pareth-5 (100% active) and mixed twice using a dental mixer at 3540 rpm for 30 second (each time), forming a satisfying emulsion, which was further diluted with 12.5 g water to form a final emulsion containing 50% active of Example material 42.

The fabric softener containing the emulsion of Example material 42 is found to provide a better softness than the control fabric softener.

Detergent Composition

The Example materials were included in a detergent composition as per Table 2:

TABLE 13

| Ingredient | Detergent composition 1 (% wt) | Detergent composition 2 (% wt) |
| --- | --- | --- |
| Water | 83.64 | 83.64 |
| Propylene glycol | 2.00 | 2.00 |
| Sodium xylene sulfonate | 0.82 | 0.82 |
| Linear potassium alkylbenzene sulfonate | 6.13 | 6.13 |
| Alcohol ethoxylate | 3.02 | 3.02 |
| Sodium lauryl ether sulfate | 2.14 | 2.14 |
| Sodium citrate | 2.00 | 2.00 |
| Example material 13 | 0.25 | — |
| Example material 26 | — | 0.25 |

The invention claimed is:

1. A fabric care composition comprising:
   a silicone based material cured via a condensation cure chemistry; and
   at least one fabric care ingredient;
   wherein the silicone based material cured via a condensation cure chemistry is the reaction product of:
   (i) at least one condensation curable silyl terminated polymer having at least one hydroxyl functional group per molecule, and having a viscosity of 1,000 to 300,000 mPa s at 25° C. measured by using a Brookfield cone plate viscometer (RV DIII) using a cone plate;
   (ii) a cross-linker selected from silanes having at least 2 hydrolysable groups and/or silyl functional molecules having at least 2 silyl groups, each silyl group containing at least one hydrolysable group; and
   (iii) a condensation catalyst selected from the group of titanates or zirconates; wherein the molar ratio of hydroxyl groups to total hydrolysable groups is between 0.4:1 to 2:1 using a silane cross-linker (ii) or 0.2:1 to 10:1 using a silyl functional molecule cross-linker (ii); and
   wherein the molar ratio of condensation catalyst (iii) M-OR functions to the total hydroxyl groups is between 0.01:1 and 0.6:1, where M is titanium or zirconium, and R is an aliphatic hydrocarbon group.

2. The fabric care composition of claim 1, wherein the silicone based material cured via a condensation cure chemistry is in neat form, in diluted form, or in emulsion form.

3. The fabric care composition of claim 1, wherein the at least one fabric care ingredient is selected from surface active materials, surfactants, detergents emulsifiers, thickeners, water phase stabilizing agents, pH controlling agents, preservatives, biocides, proteins or amino-acids and their derivatives, pigments, colorants, silicone conditioning agents, cationic conditioning agents, non-ionic conditioning agents, hydrophobic conditioning agents, UV absorbers, sunscreen agents, dyes, fragrances, perfumes, antioxidants, soil release agents, oxidizing agents, reducing agents, propellant gases, dispersibility aids, inorganic salts, antibacterial agents, antifungal agents, bleaching agents, sequestering agents, enzymes, diluents, antifoam compounds, builders, abrasives, fabric softeners, optical brighteners, soil-suspending agents, dispersants, dye transfer inhibitors, dye sequestrants, color fixatives, anti-re-deposition agents, fatty alcohols, color care additives, ironing agents, suspending agents, and mixtures thereof.

4. The fabric care composition of claim 1, wherein the at least one fabric care ingredient is selected from a cationic conditioning agent, a non-ionic conditioning agent, a hydrophobic conditioning agent, and mixtures thereof.

5. A process for preparing an emulsion, the process comprising:
   I) forming a mixture comprising;
      A) 100 parts by weight of the silicone based material cured via a condensation cure chemistry of claims 1, and
      B) 0.1 to 50 parts by weight of a surfactant; and , and
   II) admixing a sufficient amount of water to the mixture from step I) to form an emulsion.

6. A process to prepare the fabric care composition of claim 1, the process comprising mixing the silicone based material cured via a condensation cure chemistry and the at least one fabric care ingredient.

7. A process of washing and/or conditioning fabric substrates and fibres, the process comprising applying the fabric care composition of claim 1 to the fabric substrates and fibres.

8. The process of claim 7, further comprising letting the fabric care composition stand on the fabric substrates and fibres.

9. The process of claim 8, further comprising rinsing the fabric substrates and fibres.

\* \* \* \* \*